(12) United States Patent
Hunter

(10) Patent No.: US 10,196,878 B2
(45) Date of Patent: *Feb. 5, 2019

(54) MACHINES, SYSTEMS, COMPUTER-IMPLEMENTED METHODS, AND COMPUTER PROGRAM PRODUCTS TO TEST AND CERTIFY OIL AND GAS EQUIPMENT

(71) Applicant: S. P. M. FLOW CONTROL, INC., Fort Worth, TX (US)

(72) Inventor: Scott Hunter, Arlington, TX (US)

(73) Assignee: S.P.M. FLOW CONTROL, INC., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/893,009

(22) Filed: Feb. 9, 2018

(65) Prior Publication Data
US 2018/0179859 A1    Jun. 28, 2018

Related U.S. Application Data

(63) Continuation of application No. 15/201,045, filed on Jul. 1, 2016, now Pat. No. 9,915,128, which is a (Continued)

(51) Int. Cl.
*E21B 41/00* (2006.01)
*E21B 44/00* (2006.01)
(Continued)

(52) U.S. Cl.
CPC .............. *E21B 41/00* (2013.01); *E21B 44/00* (2013.01); *G01V 11/002* (2013.01);
(Continued)

(58) Field of Classification Search
CPC .......... E21B 41/00; E21B 44/00; E21B 47/00; G06F 19/00
(Continued)

(56) References Cited

U.S. PATENT DOCUMENTS

| | | |
|---|---|---|
| 2,007,203 A | 7/1935 | Kraeft |
| 2,191,782 A | 2/1940 | Valane |

(Continued)

FOREIGN PATENT DOCUMENTS

| | | |
|---|---|---|
| AR | 84750 | 11/2012 |
| AU | 346763 | 2/2013 |

(Continued)

OTHER PUBLICATIONS

"Australian Examamination Report, by IP Australia, re App No. 2013266252, dated Oct. 5, 2016, 2 pages.".
(Continued)

*Primary Examiner* — Nam V Nguyen
(74) *Attorney, Agent, or Firm* — Barta, Jones & Foley, P.C.

(57) ABSTRACT

Embodiments of machines, systems, computer-implemented methods, and computer program products certify oil and gas well equipment. Embodiments identify a selected well equipment device, a device test specification, and testing sequences to be performed by a corresponding testing apparatus. Embodiments select a testing sequence responsive to the selected device. Embodiments control the testing apparatus for the selected testing sequence so that the corresponding testing apparatus performs the sequence responsive to the device test specification. Embodiments generate testing data for the selected testing sequence and link the testing data for the selected testing sequence to the device identifier for the device so that a certificate can be generated. Embodiments generate a certificate for the selected device responsive to the testing sequences having been performed upon the selected device and link the certificate for the selected device to the device identifier so that the certificate can be readily recalled.

20 Claims, 30 Drawing Sheets

Related U.S. Application Data continuation of application No. 13/099,307, filed on May 2, 2011, now abandoned.

(60) Provisional application No. 61/330,248, filed on Apr. 30, 2010.

(51) Int. Cl.

| | |
|---|---|
| *E21B 47/00* | (2012.01) |
| *G06F 19/00* | (2018.01) |
| *G01V 11/00* | (2006.01) |
| *H04B 5/00* | (2006.01) |
| *E21B 43/26* | (2006.01) |

(52) U.S. Cl.
CPC ......... *H04B 5/0031* (2013.01); *H04B 5/0062* (2013.01); *E21B 43/26* (2013.01)

(58) Field of Classification Search
USPC ..................................... 340/10.1–10.6; 702/6
See application file for complete search history.

(56) References Cited

U.S. PATENT DOCUMENTS

| | | | |
|---|---|---|---|
| 3,129,966 A | 4/1964 | Blank | |
| 3,331,385 A | 7/1967 | Taylor | |
| 3,465,572 A | 9/1969 | Thomas | |
| 3,742,756 A | 7/1973 | Seager | |
| 3,808,879 A | 5/1974 | Rogers | |
| 4,044,833 A | 8/1977 | Volz | |
| 4,185,802 A | 1/1980 | Fischer et al. | |
| 4,266,443 A | 5/1981 | McWhorter | |
| 4,329,925 A | 5/1982 | Hane et al. | |
| 4,432,064 A | 2/1984 | Barker et al. | |
| 4,574,880 A | 3/1986 | Handke | |
| 4,866,607 A | 9/1989 | Anderson et al. | |
| 4,916,641 A | 4/1990 | Bybee | |
| 5,063,775 A | 11/1991 | Walker, Sr. et al. | |
| 5,105,881 A | 4/1992 | Thoms et al. | |
| D326,927 S | 6/1992 | Catalina | |
| 5,269,180 A | 12/1993 | Dave et al. | |
| 5,360,967 A | 11/1994 | Perkin et al. | |
| 5,372,195 A | 12/1994 | Swanson et al. | |
| 5,377,104 A | 12/1994 | Sorrells et al. | |
| D354,677 S | 1/1995 | Troyer | |
| D365,927 S | 1/1996 | Cho | |
| D368,218 S | 3/1996 | Klein, III | |
| 5,509,303 A | 4/1996 | Georgi | |
| D371,370 S | 7/1996 | Fenton et al. | |
| 5,722,490 A | 3/1998 | Ebinger | |
| 5,862,319 A * | 1/1999 | Galetti ................. G06F 11/261 |
| | | | 703/13 |
| D406,590 S | 3/1999 | Heiligenstein et al. | |
| D408,269 S | 4/1999 | Ross | |
| D408,716 S | 4/1999 | Vesledahl | |
| 6,123,394 A | 9/2000 | Jeffrey | |
| 6,346,886 B1 | 2/2002 | De La Huerga | |
| 6,347,292 B1 * | 2/2002 | Denny ................. E21B 17/006 |
| | | | 702/188 |
| 6,434,500 B1 | 8/2002 | Boehne et al. | |
| 6,457,529 B2 | 10/2002 | Calder et al. | |
| 6,480,100 B1 | 11/2002 | Frieden et al. | |
| 6,567,752 B2 | 5/2003 | Cusumano et al. | |
| 6,592,822 B1 | 7/2003 | Chandler | |
| 6,597,175 B1 | 7/2003 | Brisco | |
| 6,648,606 B2 | 11/2003 | Sabini et al. | |
| D492,670 S | 7/2004 | Hung et al. | |
| D495,223 S | 8/2004 | Altman | |
| 6,778,934 B1 * | 8/2004 | Hori ................... G05B 23/0216 |
| | | | 702/119 |
| 6,820,694 B2 | 11/2004 | Willberg et al. | |
| 6,829,542 B1 | 12/2004 | Reynolds et al. | |
| 6,831,571 B2 | 12/2004 | Bartel | |
| 6,836,215 B1 | 12/2004 | Laurash et al. | |
| 6,922,641 B2 | 7/2005 | Batzinger et al. | |
| 6,989,764 B2 | 1/2006 | Thomeer et al. | |
| 7,064,668 B2 | 6/2006 | Porad | |
| 7,069,776 B2 | 7/2006 | Tudor | |
| D527,378 S | 8/2006 | Raymond et al. | |
| 7,083,391 B2 | 8/2006 | Sievert et al. | |
| 7,096,718 B2 | 8/2006 | Matzner et al. | |
| 7,096,961 B2 | 8/2006 | Clark et al. | |
| 7,120,550 B2 * | 10/2006 | Diorio ................ G06K 19/0723 |
| | | | 702/107 |
| 7,137,451 B2 | 11/2006 | Smith | |
| D535,982 S | 1/2007 | Inoue | |
| 7,159,654 B2 | 1/2007 | Ellison et al. | |
| D538,630 S | 3/2007 | Sergi | |
| 7,239,977 B2 | 7/2007 | Fantana et al. | |
| 7,242,317 B2 | 7/2007 | Silvers | |
| 7,259,675 B2 | 8/2007 | Baker et al. | |
| D551,662 S | 9/2007 | Buren et al. | |
| 7,267,798 B2 | 9/2007 | Chandler | |
| 7,272,529 B2 | 9/2007 | Hogan et al. | |
| 7,301,474 B2 | 11/2007 | Zimmerman | |
| 7,308,331 B2 | 12/2007 | Bjornson | |
| 7,383,882 B2 | 6/2008 | Lerche et al. | |
| 7,389,870 B2 | 6/2008 | Slappay | |
| D573,589 S | 7/2008 | Montgomery et al. | |
| 7,395,188 B1 | 7/2008 | Goebel et al. | |
| 7,400,263 B2 | 7/2008 | Snider et al. | |
| 7,412,898 B1 | 8/2008 | Smith et al. | |
| D578,521 S | 10/2008 | Sergi et al. | |
| 7,433,789 B1 | 10/2008 | Balestra | |
| 7,477,160 B2 | 1/2009 | Lemenager et al. | |
| 7,484,625 B2 | 2/2009 | Scott et al. | |
| D597,086 S | 7/2009 | Sergi et al. | |
| 7,557,716 B2 | 7/2009 | Morbitzer et al. | |
| D598,274 S | 8/2009 | Nerskov | |
| 7,579,950 B2 | 8/2009 | Lerch et al. | |
| 7,603,296 B2 | 10/2009 | Whiteley et al. | |
| 7,606,682 B2 | 10/2009 | Denny et al. | |
| D603,383 S | 11/2009 | Nyalamadugu et al. | |
| 7,619,523 B2 | 11/2009 | Durtschi et al. | |
| 7,636,031 B2 | 12/2009 | Mirmobin et al. | |
| D607,442 S | 1/2010 | Su et al. | |
| 7,657,468 B1 | 2/2010 | Whiteley et al. | |
| 7,664,685 B1 | 2/2010 | Whiteley et al. | |
| 7,684,936 B2 | 3/2010 | Bechhoefer | |
| D620,483 S | 7/2010 | Conrad et al. | |
| 7,819,182 B2 | 10/2010 | Adamek | |
| 7,823,640 B2 | 11/2010 | Flanders | |
| 7,832,258 B2 | 11/2010 | Mudge et al. | |
| 7,849,619 B2 | 12/2010 | Mosher, Jr. et al. | |
| 7,893,832 B2 | 2/2011 | Laackmann | |
| 7,912,678 B2 | 3/2011 | Denny et al. | |
| 7,928,922 B2 | 4/2011 | King | |
| D651,591 S | 1/2012 | Hunter et al. | |
| D651,592 S | 1/2012 | Hunter et al. | |
| D651,593 S | 1/2012 | Hunter et al. | |
| 8,116,990 B2 | 2/2012 | Koul | |
| 8,120,497 B2 | 2/2012 | Binmore | |
| D655,081 S | 3/2012 | Maravilla et al. | |
| 8,289,173 B2 | 10/2012 | Ben-Mansour et al. | |
| 8,433,542 B2 * | 4/2013 | Kube .................. G05B 23/0256 |
| | | | 702/122 |
| 8,457,929 B2 | 6/2013 | Denny et al. | |
| 8,485,448 B2 | 7/2013 | Maizlin et al. | |
| 8,510,060 B2 | 8/2013 | Hardwicke et al. | |
| D690,687 S | 10/2013 | Sun et al. | |
| D713,825 S | 9/2014 | Witkowski et al. | |
| 8,838,418 B2 * | 9/2014 | Denny .................. E21B 17/006 |
| | | | 702/188 |
| 8,857,683 B2 | 10/2014 | Cameron et al. | |
| 8,985,156 B2 | 3/2015 | Drouin et al. | |
| D726,702 S | 4/2015 | Umlauf | |
| D731,171 S | 6/2015 | Upchurch et al. | |
| 9,367,056 B2 * | 6/2016 | Park ...................... G05B 15/02 |
| 9,417,160 B2 | 8/2016 | Hunter | |
| 9,874,870 B2 * | 1/2018 | Law ..................... G06F 11/3636 |
| 9,915,128 B2 * | 3/2018 | Hunter .................. E21B 41/00 |
| 2001/0047283 A1 | 11/2001 | Melick et al. | |
| 2002/0158120 A1 | 10/2002 | Zierolf | |

(56) References Cited

U.S. PATENT DOCUMENTS

| | | |
|---|---|---|
| 2003/0139982 A1 | 7/2003 | Schwartz et al. |
| 2003/0192690 A1 | 10/2003 | Carlson et al. |
| 2003/0209133 A1 | 11/2003 | Greenfield et al. |
| 2004/0051368 A1 | 3/2004 | Caputo et al. |
| 2004/0052202 A1 | 3/2004 | Brollier |
| 2004/0074974 A1 | 4/2004 | Senba et al. |
| 2004/0078306 A1 | 4/2004 | Whiteley et al. |
| 2004/0088115 A1 | 5/2004 | Guggari et al. |
| 2004/0107823 A1 | 6/2004 | Kiley et al. |
| 2005/0087235 A1 | 4/2005 | Skorpik et al. |
| 2005/0242962 A1 | 11/2005 | Lind et al. |
| 2006/0022056 A1 | 2/2006 | Sakama et al. |
| 2006/0028344 A1 | 2/2006 | Forster |
| 2006/0043199 A1 | 3/2006 | Baba et al. |
| 2006/0076419 A1 | 4/2006 | Johnson |
| 2006/0261958 A1 | 11/2006 | Klein et al. |
| 2007/0018825 A1 | 1/2007 | Morbitzer et al. |
| 2007/0042820 A1 | 2/2007 | Cloonan |
| 2007/0100478 A1 | 5/2007 | Egeland et al. |
| 2007/0124220 A1 | 5/2007 | Griggs et al. |
| 2007/0159336 A1 | 7/2007 | Tethrake et al. |
| 2007/0171075 A1 | 7/2007 | Ryu |
| 2007/0181726 A1 | 8/2007 | Ishikawa et al. |
| 2007/0226487 A1 | 9/2007 | Li et al. |
| 2008/0009149 A1 | 1/2008 | Arms et al. |
| 2008/0009185 A1 | 1/2008 | Knoll et al. |
| 2008/0029541 A1 | 2/2008 | Wallace et al. |
| 2008/0240983 A1* | 10/2008 | Harris .............. G01N 35/00584 422/52 |
| 2008/0252459 A1 | 10/2008 | Butler et al. |
| 2009/0006153 A1 | 1/2009 | Greiner et al. |
| 2009/0055293 A1 | 2/2009 | Mueller |
| 2009/0058610 A1 | 3/2009 | Krebs et al. |
| 2009/0094872 A1 | 4/2009 | Ali et al. |
| 2009/0112308 A1 | 4/2009 | Kassem |
| 2009/0121895 A1 | 5/2009 | Denny et al. |
| 2009/0188675 A1 | 7/2009 | Bloom et al. |
| 2009/0205820 A1 | 8/2009 | Koederitz et al. |
| 2009/0208295 A1 | 8/2009 | Kinert et al. |
| 2009/0307763 A1 | 12/2009 | Rawlins et al. |
| 2010/0051286 A1 | 3/2010 | McStay et al. |
| 2010/0096455 A1 | 4/2010 | Binmore |
| 2010/0123586 A1 | 5/2010 | Baba et al. |
| 2010/0326219 A1 | 12/2010 | Nelson et al. |
| 2011/0052423 A1 | 3/2011 | Gambier et al. |
| 2011/0060568 A1 | 3/2011 | Goldfine et al. |
| 2011/0139877 A1 | 6/2011 | Szakelyhidi et al. |
| 2011/0233283 A1 | 9/2011 | Hansen |
| 2011/0240747 A1 | 10/2011 | Stewart et al. |
| 2011/0253793 A1 | 10/2011 | King |
| 2011/0270525 A1 | 11/2011 | Hunter |
| 2011/0273296 A1 | 11/2011 | Laase et al. |
| 2012/0061091 A1 | 3/2012 | Radi |

FOREIGN PATENT DOCUMENTS

| | | |
|---|---|---|
| AU | 346764 | 2/2013 |
| AU | 346765 | 2/2013 |
| AU | 346766 | 2/2013 |
| AU | 2011245111 | 8/2015 |
| CA | 1333962 C | 1/1995 |
| CA | 2486126 A1 | 10/2005 |
| CA | 2515233 C | 10/2009 |
| CA | 2604118 C | 6/2010 |
| CA | 148446 | 8/2014 |
| CN | 1179196 A | 4/1998 |
| CN | 1503094 A | 6/2004 |
| CN | 1790208 A | 6/2006 |
| CN | 1862278 A | 11/2006 |
| CN | 101038639 A | 9/2007 |
| CN | 201035846 Y | 3/2008 |
| CN | 201142169 Y | 10/2008 |
| CN | 101320259 A | 12/2008 |
| CN | 101346677 A | 1/2009 |
| CN | 101561676 A | 10/2009 |
| CN | 102003167 A | 4/2011 |
| CN | 1920901 B | 6/2011 |
| CN | 102312728 A | 1/2012 |
| CN | ZL201230542463 S | 10/2013 |
| CN | 103793733 A | 5/2014 |
| CN | 204200827 U | 3/2015 |
| CN | 105735943 A | 7/2016 |
| DE | 102009043267 A1 | 4/2011 |
| EC | 002132621-0001 | 11/2012 |
| EC | 002132621-0002 | 11/2012 |
| EP | 0280489 A2 | 8/1988 |
| EP | 1895452 A1 | 3/2008 |
| EP | 2362061 | 8/2011 |
| FR | 2936039 A1 | 3/2010 |
| FR | 2955936 A1 | 8/2011 |
| GB | 886870 A | 1/1962 |
| GB | 1178682 A | 1/1970 |
| GB | 2419671 A | 5/2006 |
| GB | 2475195 A | 5/2011 |
| JP | 11352243 | 12/1999 |
| JP | 2002352199 A | 12/2002 |
| JP | 2003035380 A | 2/2003 |
| JP | 2003139271 A | 5/2003 |
| JP | 2003185056 A | 7/2003 |
| JP | 2004213945 A | 7/2004 |
| JP | 2005181111 A | 7/2005 |
| JP | 2005335737 A | 12/2005 |
| JP | 2008033706 A | 2/2008 |
| JP | 2009083576 A | 4/2009 |
| JP | 2010152662 A | 7/2010 |
| JP | 4767148 B2 | 9/2011 |
| KR | 20050105674 A | 11/2005 |
| KR | 20060125151 A | 12/2006 |
| KR | 849955 B1 | 8/2008 |
| KR | 100919509 B1 | 9/2009 |
| KR | 20100012277 A | 2/2010 |
| KR | 20120065631 A | 6/2012 |
| NO | 083874 | 3/2013 |
| PK | 16438 D | 5/2013 |
| SG | 146464 A1 | 10/2008 |
| SG | D2012/1277 F | 12/2012 |
| SG | D2012/1278 B | 12/2012 |
| TW | M305600 U | 2/2007 |
| TW | M305862 U | 2/2007 |
| WO | 2008012933 A1 | 1/2008 |
| WO | 2009089580 A1 | 7/2009 |
| WO | 2010018356 A2 | 2/2010 |
| WO | 2010086596 A1 | 8/2010 |
| WO | 2011137460 A2 | 11/2011 |
| WO | 2012094503 A2 | 7/2012 |
| WO | 2012119048 A2 | 9/2012 |
| WO | 2013177353 A2 | 11/2013 |
| WO | 2016019039 A1 | 2/2016 |

OTHER PUBLICATIONS

"Australian Examination Report, by IP Australia, App No. 2011245111, dated Oct. 24, 2014, 3 pages.".

"Australian Examination Report, by IP Australia, re App No. 2011245111, dated Jul. 26, 2013, 2 pages.".

"Azerbaijan Office Action, by Republic of Azerbaijan, re App No. S20120046, dated Sep. 17, 2013, 1 page.".

"Canadian Examination Report, by the CIPO, re App No. 148446, dated Aug. 20, 2013, 1 page.".

"Canadian Examination Report, by the CIPO, re App No. 148446, dated Jan. 13, 2014, 11 pages.".

"Canadian Office Action, by the CIPO, re App No. 2797081, dated Jun. 4, 2015, 9 pages.".

"Canadian Office Action, by the CIPO, re App No. 2797081, dated May 2, 2014, 7 pages.".

"Canadian Office Action, by the CIPO, re App No. 2797081, dated May 20, 2016, 8 pages.".

"Chinese Office Action, by SIPO, re App No. 201180032488.0, dated Aug. 8, 2014, 19 pages.".

"Chinese Office Action, by the SIPO, re App No. 201180032488.0, dated Apr. 9, 2015, 2 pages.".

(56) References Cited

OTHER PUBLICATIONS

"Chinese Office Action, by the SIPO, re App No. 201380039649.8, dated May 23, 2016, 5 pages.".
"Eurasian Office Action, by the Eurasian Patent Office, re App No. 2012291142, dated Apr. 13, 2015, 3 pages.".
"International Preliminary Report on Patentability, by the IPEA/US, re PCT/US2013/042345, dated Jul. 16, 2014, 25 pages.".
"International Search Report and Written Opinion, by the ISA/US, re PCT/US16/37994, dated Nov. 2, 2016, 8 pages.".
"International Search Report and Written Opinion, by the ISA/US, re PCT/US16/46364, dated Nov. 4, 2016, 23 pages.".
International Search Report and Written Opinion, by the ISA/US, re PCT/US2011/034863, dated Nov. 2, 2011, 9 pages.
"International Search Report and Written Opinion, by the ISA/US, re PCT/US2013/042345, dated Dec. 2, 2013, 14 pages.".
"International Search Report and Written Opinion, by the ISA/US, re PCT/US2015/042694, dated Oct. 5, 2015, 12 pages.".
Kurita, T., et al., "Network Wireless Sensor for Remote Monitoring of Gas Wells," Fuji Electric Review Journal, 2006, vol. 53 (1), pp. 17-20.
Leung, T., "New Wireless Solution Improves Visibility, Value, Safety," E&P (www.epmag.com), Aug. 1, 2010, p. 20.
"Mexican Office Action, by the IMPI, re App No. MX/a/2012/012444, dated Oct. 31, 2014, 10 pages.".
"Mexican Office Action, by the IMPI, re App No. MX/a/2012/012444, dated Sep. 19, 2013, 7 pages.".
"Mexican Office Action, by the IMPI, re App No. MX/a/2012/012444, dated Jun. 13, 2014, 10 pages.".
"Mexican Office Action, by the IMPI, re App No. MX/a/2015/017784, dated Feb. 7, 2017, 2 pages.".
"Mexican Office Action, by the IMPI, re App No. MX/f/2012/003572, dated Jul. 2012, 10 pages.".
"Notice of Allowance, by the USPTO, re U.S. Appl. No. 10/755,456, dated Apr. 12, 2006, 4 pages.".
"Notice of Allowance, by the USPTO, re U.S. Appl. No. 29/393,452, dated Oct. 7, 2011, 11 pages.".
"Notice of Allowance, by the USPTO, re U.S. Appl. No. 29/393,453, dated Oct. 7, 2011, 10 pages.".
"Notice of Allowance, by the USPTO, re U.S. Appl. No. 29/393,454, dated Oct. 7, 2011, 10 pages.".
"Notice of Allowance, by the USPTO, re U.S. Appl. No. 29/420,448, dated May 16, 2014, 31 pages.".
"Notice of Allowance, by the USPTO, re U.S. Appl. No. 29/503,568, dated Oct. 19, 2015, 10 pages.".
"Notification of the Decision to Grant a Patent, by SIPO, re Chinese Application No. 201380039649.8, dated Jan. 20, 2017, 5 pages.".
"Office Action, by the USPTO, re U.S. Appl. No. 10/755,456, dated Aug. 30, 2005, 4 pages.".
"Office Action, by the USPTO, re U.S. Appl. No. 10/755,456, dated Oct. 7, 2005, 7 pages.".
"Office Action, by the USPTO, re U.S. Appl. No. 10/755,456, dated Feb. 21, 2006, 5 pages.".
"Office Action, by the USPTO, re U.S. Appl. No. 13/099,307, dated Apr. 24, 2015, 31 pages.".
"Office Action, by the USPTO, re U.S. Appl. No. 13/099,307, dated Jan. 4, 2016, 27 pages.".
"Office Action, by the USPTO, re U.S. Appl. No. 13/099,307, dated Sep. 17, 2013, 21 pages.".
"Office Action, by the USPTO, re U.S. Appl. No. 13/099,307, dated Sep. 30, 2014, 25 pages.".
"Pakistan Office Action, re App No. 16438-D, dated 2012, 2 pages.".
PC-102-Dome specification sheet, (Available at http://troirfid.com and yahoo.sub.site.sub.admin/assets/docs/PC-102.sub/Dome.277173131.xls, last visited Jul. 12, 2011), 1 page.
Petersen, S., et al., "A Survey of Wireless Technology for the Oil and Gas Industry," Society of Petroleum Engineers, 2008 SPE Intelligent Energy Conference and Exhibition, Feb. 25-27, 2008, Amsterdam, The Netherlands, 10 pages.
"Russian Office Action, re App No. 2012503905, dated Oct. 21, 2013, 8 pages.".
Schempf, H. Ph.D., "GasNet: Gas Main Sensor and Communications Network System, Phase 1 Topical Report," Document No. REP-GOV, DOE-020303, Work Performed by Automatika, Inc., Pittsburgh, PA15238, Feb. 27, 2003, 40 pages.
TROI-Home, http://www.troirfid.com, last visited Jul. 12, 2011, 4 pages.
"Supplemental European Search Report, by the EPO, re EP App No. 11775718.7, dated Apr. 8, 2015, 9 pages.".
"Supplementary European Search Report, by the EPO, re EP App No. 13793301.6, dated Jun. 10, 2016, 8 pages.".

* cited by examiner

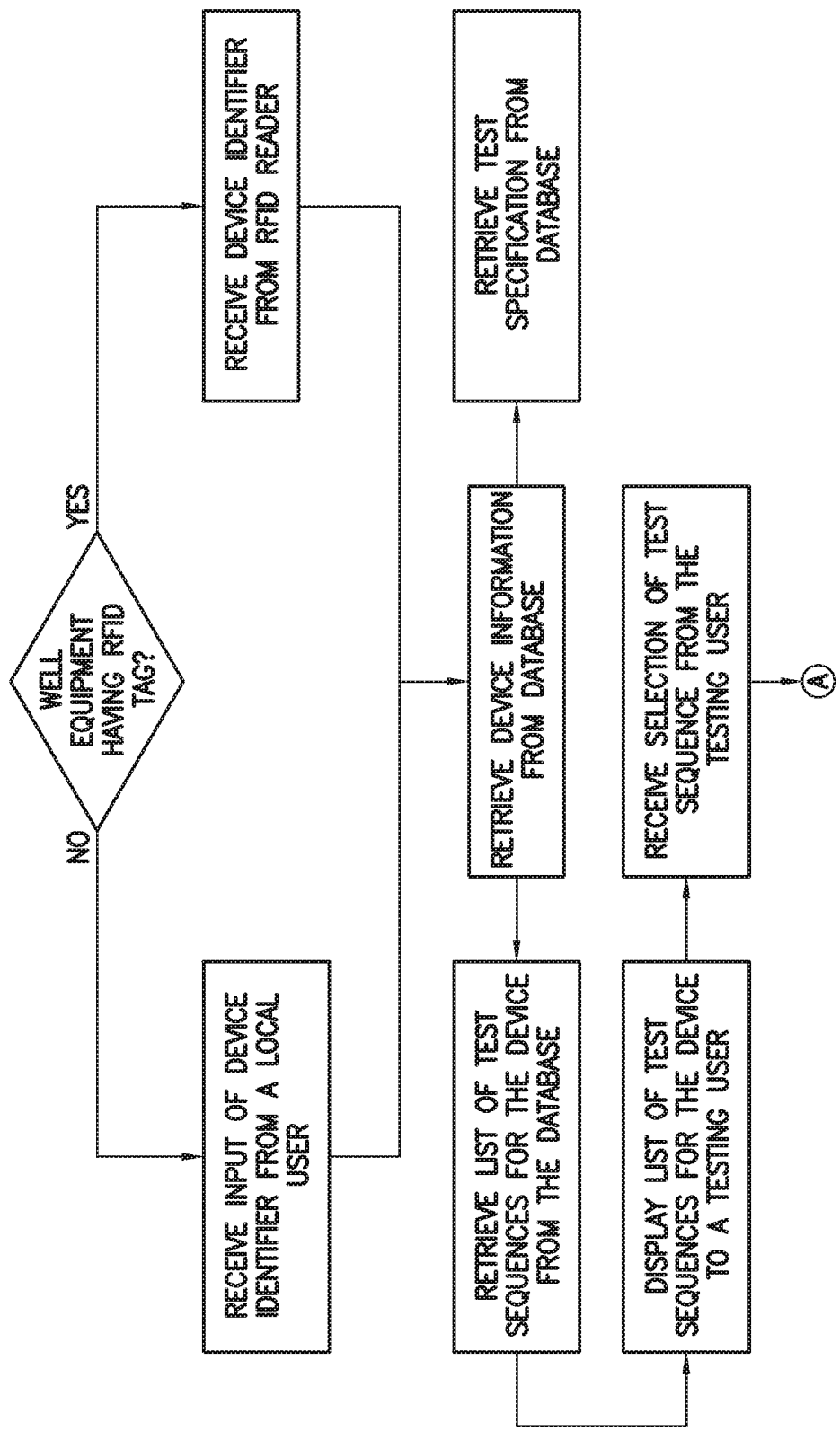

FIG.5    CERTIFICATION 500

SERIAL NUMBER: — 501

| | | |
|---|---|---|
| Customer: | Cust Num: | Plant: |
| Work Order: | Part Num: 2A1 | Mfr: |
| Description: | MXF/INT/4 LR10 WR | |
| District | | |

Visual Inspection—PASS — 502

Comments:
Inspected By: SCOTT H      Test Date: March 18, 2010

Wall Thickness Inspection—PASS — 502

Comments:
Thickness Gauge: VERSION: 1.13/1.01s
Gauge Cal Date: March 18, 2010
Wall Thickness Values (minimum in parenthesis):
505 — A: 0.60"(0.40"), B: 0.60"(0.44"), C: 0.88" (0.36"), D: 0.88" (0.39")
506 —

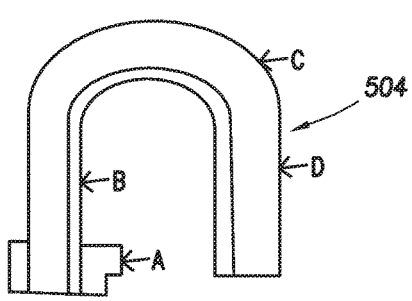

Inspected By:
Test Date:

Disassembly/Assembly—PASS — 502

Comments:
Inspected By:      Test Date: March 18, 2010

Magnetic Particle Inspection—N/A — 502

Comments: THIS TEST WAS NOT PERFORMED FOR THIS IRON
Mag Part      Gauge Cal Date:
Inspected By:      Test Date:

Pressure Test—PASS — 502, 503

Comments: good
Required Test Pres: 10000 PSI
Rated Working Pres: 10000 PSI
Test Duration: minutes
Tested By:
Approved By:
Test Date: March 18, 2010
Pres Gauge: 357808
Gauge Cal Date: March 16, 2010
Pres Recorder:
Recorder Cal Date:

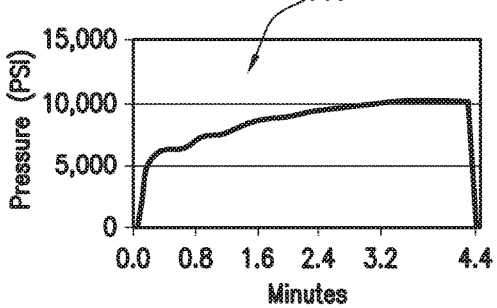

Service Center Service History

Date: 02/24/2010
Location:
Description: 5 piece Rental
Inspection: Rental
Wo / Sro#:

Customer:
Group ID / Unit #:
Quantity: 6
Start Date: 02/24/2010
Finish Date:
Approved By:

Specifications to be followed:  SERVICE COMPANY

Product Description

Cust P/N: 100011214    Cust S/N: TEST003
Mfr P/N:                Mfr S/N:
Mfr:           Product Type: CHECK VALVE Size: 1.5"
Style: DART
Connections: UNION CONNECTIONS
Configureation: FXM Svc:
Pressure Rating: 15,000.00
Test Pressure: 15,000.00
Test Duration: min

Inspections Performed

| | Pass/Fail | Inspector | Date |
|---|---|---|---|
| Visual: | | | |
| UTWall Thickness: | N/A | | |
| Disambly/Asmbly: | N/A | | |
| Magnetic Particle: | | | |
| Pressure: | | | |
| Paint: | | | |
| Final: | | | |

Gauges Used

| | Serial Number | | Serial Number |
|---|---|---|---|
| Calipers: | | No Go Gauge Kit: | |
| UT Meter: | | | |
| MPI Equip: | | Pres Recorder: | |
| Pres Gauge: | | | |

Wall Thickness Information

| Inspection Point: | A | B | C | D | E | F | G | H | I | J | K | L | M | N | O |
|---|---|---|---|---|---|---|---|---|---|---|---|---|---|---|---|
| New Wall Thickness (if reqd): | 1.01 | 0.64 | 1.19 | 0.47 | | | | | | | | | | | |
| Min Allowable Wall Thick (Spec: | 0.72 | 0.50 | 1.05 | 0.33 | | | | | | | | | | | |
| Actual Measurement: | | | | | | | | | | | | | | | |

Iron Inventory

Date: 02/24/2010  Customer:
Location:  Group ID / Unit #:
Description: 5 piece Rental  Quantity: 6
Inspection: Rental  Start Date: 02/24/2010
  Finish Date:
Wo / Sro#:  Approved By:

Specifications to be followed: SERVICE COMPANY

| Serial Number | Part Number | Status | Description |
|---|---|---|---|
| | | Visual Inspection (PENDING) | 1.5 X 1.5-1502 DART STYLE CHECK VALVE UNION CONNECTIONS |
| | | Visual Inspection (PENDING) | PPG ASSY/2-1502 PS 240.00 |
| | | Wall Thickness (PENDING) | SWVL ASSY/STL 10 MXF/INT/2 LR15 |
| | | Wall Thickness (PENDING) | SWVL ASSY/STL 50 MXF/INT/2 LR15 |
| | | Wall Thickness (PENDING) | SWVL ASSY/STL 50 MXF/INT/2 LR15 |

MACHINES, SYSTEMS, COMPUTER-IMPLEMENTED METHODS, AND COMPUTER PROGRAM PRODUCTS TO TEST AND CERTIFY OIL AND GAS EQUIPMENT

CROSS REFERENCING OF RELATED APPLICATIONS

This application is a continuation of U.S. patent application Ser. No. 15/201,045, filed Jul. 1, 2016 and now U.S. Pat. No. 9,915,128, entitled "Machines, Systems, Computer-Implemented Methods, and Computer Program Products to Test and Certify Oil and Gas Equipment," which is a continuation of U.S. PATENT APPLICATION Ser. No. 13/099,307, filed May 2, 2011 and now abandoned, entitled "Machines, Systems, Computer-Implemented Methods, and Computer Program Products to Test and Certify Oil and Gas Equipment," which claims priority to and the benefit of U.S. Provisional Patent Application Serial No. 61/330,248 filed Apr. 30, 2010, entitled "Machines, Systems, Computer-Implemented Methods, and Computer Program Products to Test and Certify Oil and Gas Equipment," each of which are incorporated herein by reference in their entirety for all purposes.

FIELD OF THE INVENTION

The present invention relates to oil and gas production. In more particular aspects, the present invention relates to testing and certification of equipment used in oil and gas production.

BACKGROUND

The production of oil and gas requires specialized well equipment, such as pipes, valves, joints, and fittings that operate in extreme conditions, including, for example, high pressure, temperature, volatility, and corrosivity. Such conditions promote the rapid wear of well equipment and increase the potential for failure. Moreover, when well equipment does fail, the impact of the failure is typically catastrophic. For example, the failure of well equipment can result in massive explosions that hurt workers, destroy property, and halt operations for a significant time—potentially costing millions of dollars in liabilities, repairs, and lost revenue.

Well equipment particularly susceptible to catastrophic failure includes, for example, the equipment used in the process of hydraulic fracturing known as "fracing" or "fracking." The process of fracing creates or extends fractures in subterranean rock formations by pumping fluid into the formation at high pressure. For example, fluid-driven fractures can be formed at the borehole in a drilling operation and then "grown" or extended into the rock formations. The injected fluid may contain "proppant" particles, such as grains of sand or ceramic, to lodge in the fractures thereby keeping them open. Fracing is used to improve the rate at which oil and gas can be produced from a reservoir, and fracing is especially useful for extracting oil and gas from formations having low porosity and permeability, such as shale rock and other formations deep below the earth's surface. The equipment used in hydraulic fracturing for oil and gas wells can include, for example, a slurry blender, high pressure/volume fracturing pumps, high pressure treating iron, and other pipes, joints, valves, and fittings, which are known as "frac iron" or, simply, "iron." For example, frac iron can include swivel joints, pup joints, plug valves, check valves and relief valves.

To mitigate the likelihood and impact of their failure, frac iron must be periodically inspected and recertified according to certain specifications, which can be provided by, for example, a manufacturer or operator of the frac iron. Because of the likelihood and impact of failure, inspections can be performed as frequently as every 90 days. Inspections and recertifications typically require several different test procedures, which may include, for example, a visual check of bores, connections, seal surfaces; wall thickness measurements to check for erosion or corrosion, for example, using ultrasonic measurement; crack tests, for example, using magnetic particle measurement; and pressure tests, for example, of over 20,000 pounds per square inch (PSI).

Previously known methods to certify frac iron were lengthy and laborious, often lasting one to three weeks and requiring a human tester to control all testing, to record the results manually, and later to enter the results into a database—costing valuable production capacity due to downtime.

Also, previously known methods to certify frac iron were susceptible to inconsistencies due to the manually intensive nature of the certification, such as inconsistent performance of testing operations and inconsistent adherence to prescribed test specifications. Also, for example, certification records were created by manual input, introducing human error and recording and measurement variances into the certification records.

Also, previously known methods to certify frac iron were susceptible to operational inefficiencies. For example, certification records were kept in hard copy, which did not allow on-site operators to readily access certifications while in the field, which may be a remote location such as an offshore rig. Furthermore, certification records and the test results associated therewith could not be tracked, updated, or reported on from a central control center.

SUMMARY OF THE INVENTION

Embodiments of the present invention provide systems, methods, and machines for testing and certifying well equipment that enhance testing management, certification management, field operations management, and asset management. For example, embodiments of the present invention increase efficiency in testing and certifying well equipment by providing a systematic solution to control testing operations. Also, embodiments of the present invention increase efficiency in testing and certifying well equipment by seamlessly generating, storing, and processing testing data immediately upon performance of the testing operations, allowing a user to view the testing data in real time. Also, embodiments of the present invention increase efficiency in testing and certifying well equipment by dynamically generating certificates and reports responsive to the testing data according to multiple formats or user criteria.

Furthermore, well equipment testing according to embodiments of the present invention benefit from an increased likelihood of effective and safe operation because embodiments of the present invention systematically ensuring that testers use the proper test specifications and perform all test operations according to defined test sequences. Also, well equipment tested according to embodiments of the present invention benefit from an increased likelihood of effective and safe operation because embodiments of the present invention systematically ensure that equipment that fail any test sequence according to defined testing specifications are scrapped in the system and are unable to proceed in further testing or operation. Also, well equipment testing according to embodiments of the present invention benefit from an increased likelihood of effective and safe operation because operational crews can more, readily access certificates, including comprehensive testing and certification data, on-demand and on-site. Furthermore, manufacturers and suppliers of well equipment can benefit from embodiments of the present invention by enhancing research and development efforts with greater knowledge of real-world wear patterns and wear rates for well equipment devices.

In view of the foregoing, applicant has provided a machine to manage periodic testing and certification of well equipment devices, the testing and certification being facilitated by a plurality of testing apparatus performing one or more testing operations upon the well equipment devices. The machine comprises a processor, a non-transitory memory, an input/output unit to communicate with the plurality of testing apparatus, a database positioned to match a device identifier to a well equipment device, a test specification, and a plurality of testing sequences. The machine also comprises a testing module stored in the memory, the memory being a tangible, non-transitory, computer-readable storage medium, and the testing module being operable by the processor, the testing module comprising a set of instructions that, when executed by the processor, cause the testing module to perform operations. The operations of the testing module include identifying a selected well equipment device, a device test specification, and a plurality of testing sequences, the identifying operation responsive to receiving a device identifier for the selected well equipment device, each testing sequence of the plurality of testing sequences to be performed by a corresponding testing apparatus of the plurality of testing apparatus, each testing sequence defining a sequence of testing operations.

The operations of the testing module further include selecting a testing sequence of the plurality of testing sequences, the selecting operation responsive to the selected well equipment device being positioned so that the corresponding testing apparatus for the selected testing sequence can perform testing operations upon the selected well equipment device.

The operations of the testing module further include controlling the corresponding testing apparatus for the selected testing sequence so that the corresponding testing apparatus performs the sequence of testing operations upon the selected well equipment device, the sequence of testing operations being performed responsive to the device test specification. The operations of the testing module further include generating testing data for the selected testing sequence responsive to receiving output from the corresponding testing apparatus for selected testing sequence performing the sequence of testing operations.

The operations of the testing module further include linking the testing data for the selected testing sequence to the device identifier for the selected well equipment device in the database so that a certificate can be generated responsive thereto; and The machine also comprises a certification module stored in the memory, the memory being a tangible, non-transitory, computer-readable storage medium, and the certification module being operable by the processor, the certification module comprising a set of instructions that, when executed by the processor, cause the certification module to perform certain operations.

The operations of the certification module include identifying a selected well equipment device, a device test specification, and testing data for a plurality of testing sequences, the identifying operation responsive to receiving a device identifier for the selected well equipment device.

The operations of the certification module further include generating a certificate for the selected well equipment device responsive to the testing data for the plurality of testing sequences, the plurality of testing sequences having been performed upon the selected well equipment device responsive to the device test specification.

The operations of the certification module further include linking the certificate for the selected well equipment device to the device identifier for the selected well equipment device in the database so that the certificate can be readily recalled from the database responsive to the device identifier.

Also in view of the foregoing, applicant has provided a system to certify oil and gas well equipment. The system comprises a plurality of devices to be used in well equipment to define a plurality of well equipment devices, each well equipment device of the plurality of well equipment devices having a device identifier associated therewith. The system further comprises a central management server positioned to identify a device test specification and a plurality of testing sequences for a selected well equipment device responsive to receiving a device identifier for the selected well equipment device, the device test specification and the plurality of testing sequences defining certification criteria for the well equipment device. The system further comprises a plurality of testing apparatus, each testing apparatus positioned to perform a testing sequence upon the well equipment device, the testing sequence being a sequence of testing operations, the sequence of testing operations being performed responsive to the device test specification. The system further comprises a plurality of controllers, each controller positioned to receive commands responsive to the certification criteria from the central management server and to control the plurality of testing apparatus performing the sequence of testing operations upon the selected well equipment device responsive to the device test specification. The system further comprises a certificate generated responsive to the plurality of testing apparatus performing the plurality of testing sequences upon the well equipment device, the certificate indicating whether selected well equipment device has been tested according to the certification criteria within a pre-selected period of time.

Also in view of the foregoing, applicant has also provided a computer-implemented method to manage periodic testing of a plurality of well equipment devices, the testing being facilitated by a plurality of testing apparatus performing one or more testing operations upon the plurality of well equipment devices. The computer-implemented method comprises receiving a device identifier for a selected well equipment device of the plurality of well equipment devices. The computer-implemented method further comprises identifying the selected well equipment device, a device test specification, and plurality of testing sequences, the identifying operation being responsive to the receiving operation, each testing sequence of the plurality of testing sequences to be performed by a corresponding testing apparatus of the plurality of testing apparatus, each testing sequence defining a sequence of testing operations. The computer-implemented method further comprises selecting a testing sequence of the plurality of testing sequences to define a selected testing sequence, the selecting operation responsive to the selected well equipment device being positioned so that the corresponding testing apparatus for the selected testing sequence can perform testing operations upon the selected well equipment device. The computer-implemented method further comprises calibrating the corresponding testing apparatus for the selected testing sequence responsive to the device test specification. The computer-implemented method further comprises controlling the corresponding testing apparatus for the selected testing sequence so that the corresponding testing apparatus performs the sequence of testing operations upon the selected well equipment device, the sequence of testing operations being performed responsive to the device test specification. The computer-implemented method further comprises generating testing data for the selected testing sequence responsive to receiving output from the corresponding testing apparatus for selected testing sequence performing the sequence of testing operations. The computer-implemented method further comprises linking the testing data for the selected testing sequence to the device identifier for the selected well equipment device in a database so that a certificate can be generated responsive thereto.

Also in view of the foregoing, applicant has also provided a computer program product to manage periodic testing of a plurality of well equipment devices. The computer program product can be stored in a memory, the memory being a tangible, non-transitory, computer-readable storage medium, and the computer program product being operable by a processor. The computer program product comprises a set of instructions that, when executed by the processor, cause the testing module to perform certain operations. The operations performed by the computer program product includes identifying a selected well equipment device, a device test specification, and a plurality of testing sequences, the identifying operation responsive to receiving a device identifier for the selected well equipment device, each testing sequence of the plurality of testing sequences to be performed by a corresponding testing apparatus of the plurality of testing apparatus, each testing sequence defining a sequence of testing operations. The operations performed by the computer program product further includes selecting a testing sequence of the plurality of testing sequences, the selecting operation responsive to the selected well equipment device being positioned so that the corresponding testing apparatus for the selected testing sequence can perform testing operations upon the selected well equipment device. The operations performed by the computer program product further includes controlling the corresponding testing apparatus for the selected testing sequence so that the corresponding testing apparatus performs the sequence of testing operations upon the selected well equipment device, the sequence of testing operations being performed responsive to the device test specification. The operations performed by the computer program product further includes generating testing data for the selected testing sequence responsive to receiving output from the corresponding testing apparatus for selected testing sequence performing the sequence of testing operations. The operations performed by the computer program product further includes linking the testing data for the selected testing sequence to the device identifier for the selected well equipment device in the database so that a certificate can be generated responsive thereto. The operations performed by the computer program product further includes identifying a selected well equipment device, a device test specification, and testing data for a plurality of testing sequences, the identifying operation responsive to receiving a device identifier for the selected well equipment device. The operations performed by the computer program product further includes generating a certificate for the selected well equipment device responsive to the testing data for the plurality of testing sequences, the plurality of testing sequences having been performed upon the selected well equipment device responsive to the device test specification. The operations performed by the computer program product further includes linking the certificate for the selected well equipment device to the device identifier for the selected well equipment device in the database so that the certificate can be readily recalled from the database responsive to the device identifier.

BRIEF DESCRIPTION OF THE DRAWINGS

So that the manner in which the features and benefits of the invention, as well as others which will become apparent, may be understood in more detail, a more particular description of the invention briefly summarized above may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

FIG. 3A is a flowchart illustrating a first portion of program product logic and computer-implemented methods for certifying well equipment according to an embodiment of the present invention;

FIG. 5 is an exemplary certificate according to an embodiment of the present invention;

FIG. 14 is a sixth testing interface display according to embodiments of the present invention;

Figure 23:
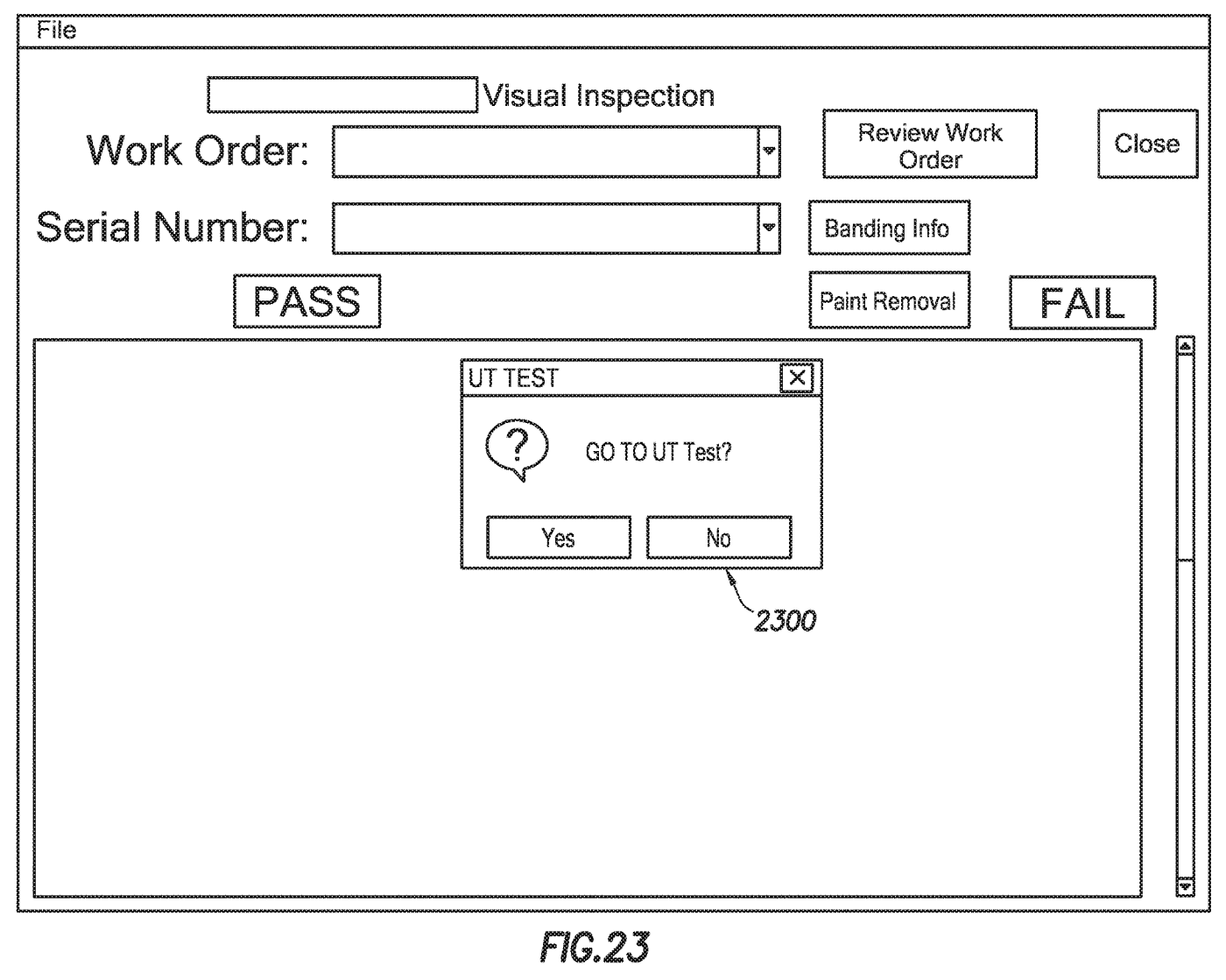

FIG. 23 is a fifteenth testing interface display according to embodiments of the present invention;

FIG. 24 is a first reporting interface display according to embodiments of the present invention; and FIG. 25 is a second reporting interface display according to embodiments of the present invention.

DETAILED DESCRIPTION

Figure 1:
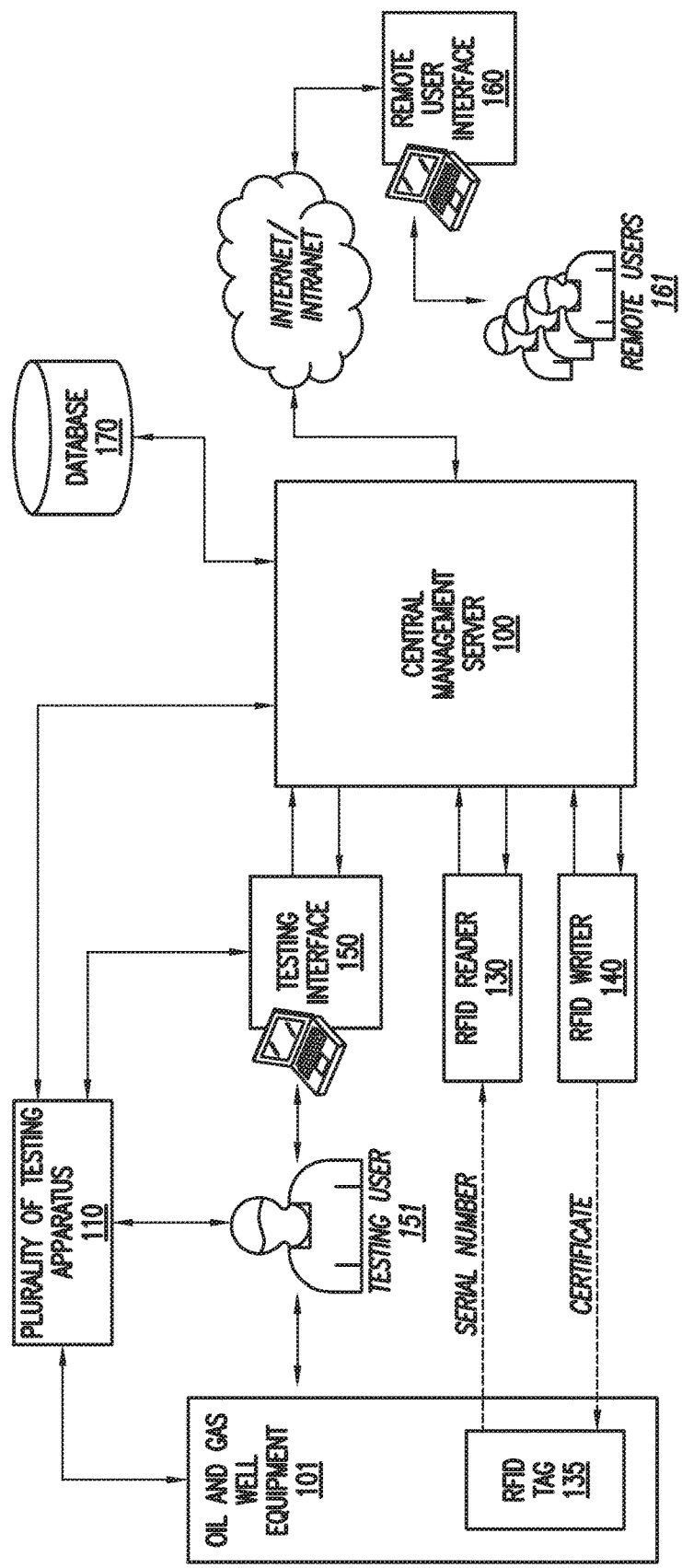
FIG. 1 is a schematic diagram illustrating exemplary data flows and interactions among components of a system to certify well equipment according to an embodiment of the present invention.

The present invention will now be described more fully hereinafter with reference to the accompanying drawings, which illustrate various embodiments of the invention. This invention, however, may be embodied in many different forms and should not be construed as limited to the embodiments set forth herein. Rather, these embodiments are provided so that this disclosure will be thorough and complete, and will fully convey the scope of the invention to those skilled in the art. It is to be fully recognized that the different teachings of the various embodiments discussed below may be employed separately or in any suitable combination to produce desired results. The various characteristics mentioned above, as well as other features and characteristics described in more detail below, will be readily apparent to those skilled in the art upon reading the following detailed description of the various embodiments, and by referring to the accompanying drawings. In the drawings and description that follow, like parts are marked throughout the specification and drawings with the same reference numerals, respectively. The prime notation, if used, indicates similar elements in alternative embodiments. The drawings are not necessarily to scale. Certain features of the disclosure may be shown exaggerated in scale or in somewhat schematic form and some details of conventional elements may not be shown in the interest of clarity and conciseness.

Accordingly, embodiments of the present invention improve safety, effectiveness, and efficiency of operating well equipment by meeting the foregoing objectives to mitigate the likelihood and impact of the failure of such equipment. In embodiments of the present invention, "well equipment devices" includes the equipment and devices used in hydraulic fracturing for oil and gas wells, i.e. "high pressure hydraulic fracturing flow iron," "frac iron," or, simply, "iron." Frac iron can include, for example, a slurry blender, high pressure/volume fracturing pumps, high pressure treating iron, and other pipes, joints, valves, and fittings. For example, frac iron can include swivel joints, pup joints, plug valves, check valves and relief valves. Furthermore, by way of example, frac iron can include any type of ball injector, crow's foot, air chamber, crossover, hose, pipes/piping, hose loop, ball injector tee body, tee, wye, lateral, ell, check valve, plug valve, wellhead adapter, swivel joint, plug, relief valve, densometer, cross, frac pump, or cement pump. Those skilled in the art will appreciate that embodiments of the present invention are not limited to uses related to in oil and gas wells, but, rather, embodiments of the present invention are applicable to processes for testing or certifying any industrial equipment or device, and at any stage in the lifespan of the equipment, including during or after manufacturing and before, during, or after use or ongoing operations.

FIG. 1 illustrates a central management server 100 for performing operations of a testing module 220 and a certification module 210. The central management server 100 is positioned to be in communication with a plurality of testing apparatus 110. The plurality of testing apparatus 110 is capable of performing testing operations on a selected well equipment device 101. The central management server 100 is positioned to systematically control the performing of testing operations upon the well equipment device 101, systematically record and process the results of such testing operations, and systematically generate a certificate responsive to such recording and processing. Embodiments of the present invention providing systems, methods, and machines to certify of well equipment and are further described herein with specific reference to the drawings.

Central Management Server 100

Figure 2:
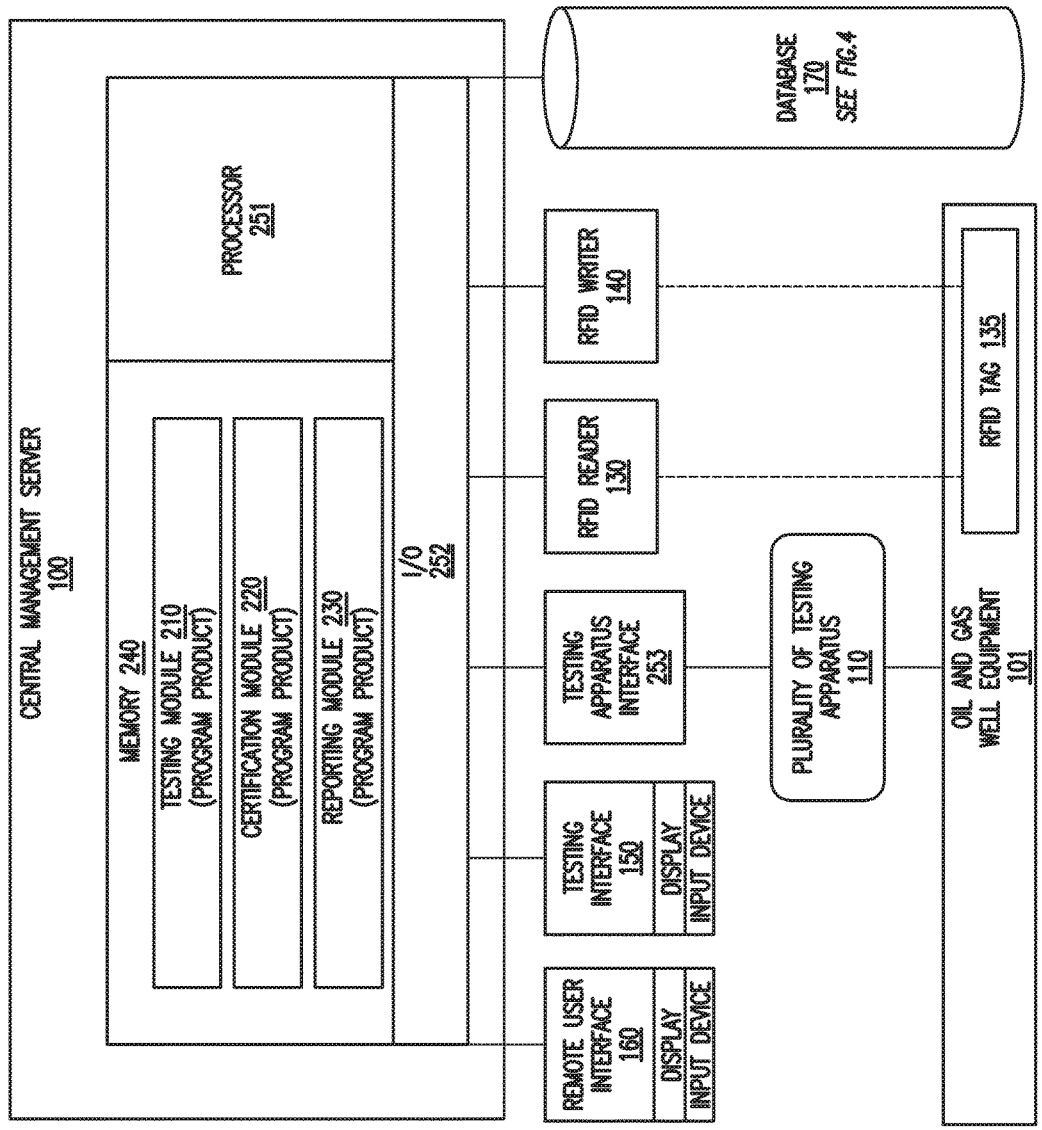
FIG. 2 is a schematic illustrating exemplary components and connections of a central management server to certify well equipment according to an embodiment of the present invention.
Figure 3B:
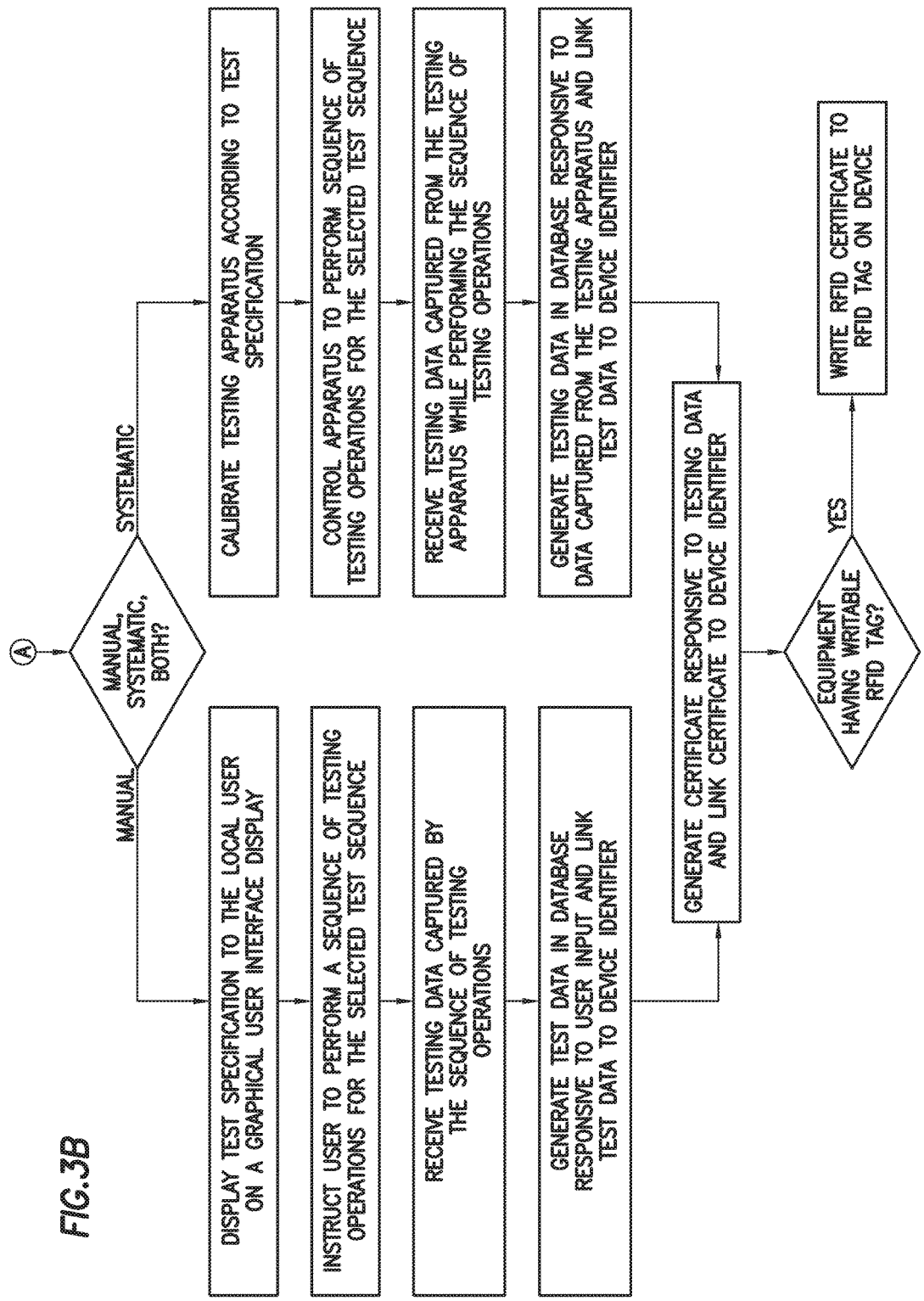
FIG. 3B is a flowchart illustrating a second portion of the program product logic and computer-implemented methods for certifying well equipment according to an embodiment of the present invention.

An embodiment of a central management server 100, as illustrated in FIG. 2, can be configured as a computer, a server, or a machine of distributed computers or servers that at least include non-transitory memory 240, program products 210, 220, and 230, a processor or processors 251, an input/output device or devices ("I/O") 252.

I/O 252 connects the central management server 100 to a database 170, a testing interface 150, and one or more testing apparatus 110 (although represented as one block, those of skill in the art will appreciate that a plurality of testing apparatus 110 may include one or more links to the I/O) to thereby allow central management server 100 to send and receive commands and data, I/O 252 can be any I/O including, but not limited to a network card/controller connected by a PCI (Peripheral Component Interconnect) bus to the motherboard, or hardware built into the motherboard of the central management server 100 to connect same to the forgoing database, interface, and apparatus.

As those of skill in the art will appreciate, I/O 252 can connect the central management server 100 with any other compatible machine, server, system, device, or equipment having a suitable physical interface and that I/O 252 and/or computer program products 210, 220, and 230 on non-transitory memory 240 may be positioned to understand, convert, or translate application or communication protocols of such machines, servers, systems, devices, or equipment irrespective of native protocols. Also, one of skill in the art will understand that I/O 252 can include or otherwise incorporate any logical or physical technology necessary to effect a connection with any of the aforementioned devices, including, for example, hubs, switches, routers, converters, amplifiers, and wireless transceivers. For example, as is further described herein, I/O 252 can also connect the central management server 100 to devices for interacting with radio frequency identification (RFID) devices, such as an RFID reader or interrogator 130 and an RFID writer 140. The central management server 100 can further connect to a remote user interface 160 for interacting with a remote user 161, as is also discussed further herein. Also, the plurality of testing apparatus 110, RFID reader 130, and the RFID writer 140 may be configured as peripherals to the testing interface 150. Also, there a testing apparatus 110 interface 253, such as a programmable logic controller (PLC), an interface between the I/O 252 and the plurality of testing apparatus 110 to control the plurality of testing apparatus 110.

As can be seen in FIG. 2, the I/O 252 is connected to a processor 251. The processor 251 is the "brains" of the central management server, and as such executes program products 210, 220, and 230 and works in conjunction with the I/O 252 to direct data to the non-transitory memory 240 and to send data from the non-transitory memory 240 to the database 170, the testing interface 150, and one or more testing apparatus 110. The processor 251 can be any commercially available processor, or plurality of processors, adapted for use in or with the central management server 100, e.g., Intel® Xeon® multicore processors, Intel® microarchitecture Nehalem, and AMD Opteron™ multicore processors. As one skilled in the art will appreciate, processor 251 may also include components that allow the central management server 100 to be connected to a display, as will be understood by those skilled in the art, and keyboard or other peripherals that would allow a user to directly or indirectly access the processor 251 and non-transitory memory 240.

Non-transitory memory 240 stores computer program products 210, 220, and 230 having instructions for execution on the processor 251, and consists of both non-volatile memory, e.g., hard disks, flash memory, optical disks, and the like, and volatile memory, e.g., SRAM, DRAM, and SDRAM as required to support embodiments of the instant invention. As one skilled in the art will appreciate, though the non-transitory memory 240 is depicted on, e.g., a motherboard, of the central management server 100, the non-transitory memory 240 may also be a separate component or device, e.g., FLASH memory, connected to the central management server 100 through the I/O 252. The non-transitory memory 240 may also store applications that various workstations or remote units can access and run on the central management server 100. For example, a testing user 151 may access applications and computer program products stored on the non-transitory memory 240 and run on the processor 251 using the testing interface 150. Importantly, non-transitory memory 240 stores the program products 210, 220, and 230 of the instant invention. As one skilled in the art will understand, the program products 210, 220, and 230, along with one or more databases/tables/fields/records for data associated with the selected well equipment device 101 can be stored either in non-transitory memory 240 or in separate non-transitory memory associated, for example, with a storage medium such as database 170, positioned in communication with the central management server 100.

Database 170

As seen in FIG. 1 and FIG. 2, the database 170 is in communication with the central management server 100. Although the database 170 is illustrated according to an embodiment in which the database 170 is separate and distinct from the central management server 100, for example, as a database server, the present invention may also include any arrangement of the database 170 in communication with the central management server 100, including the database 170 being incorporated into the same computer, server, machine, or system constituting the central management server 100, as one physical unit, for example, as an application or partition in the central management server 100 or as an installed component of the central management server 100 communicating with the processor 251 through the use of the I/O and having, for example, a database memory separate and distinct from memory 240, such as a hard drive, optical storage, or the like. Database 170, as is understood in the art, can include a processor directing data from a bus into the database memory, which can be, for example, a hard drive, optical storage or the like, and computer software that provides computers, including the central management server, access the data therein.

Figure 4:
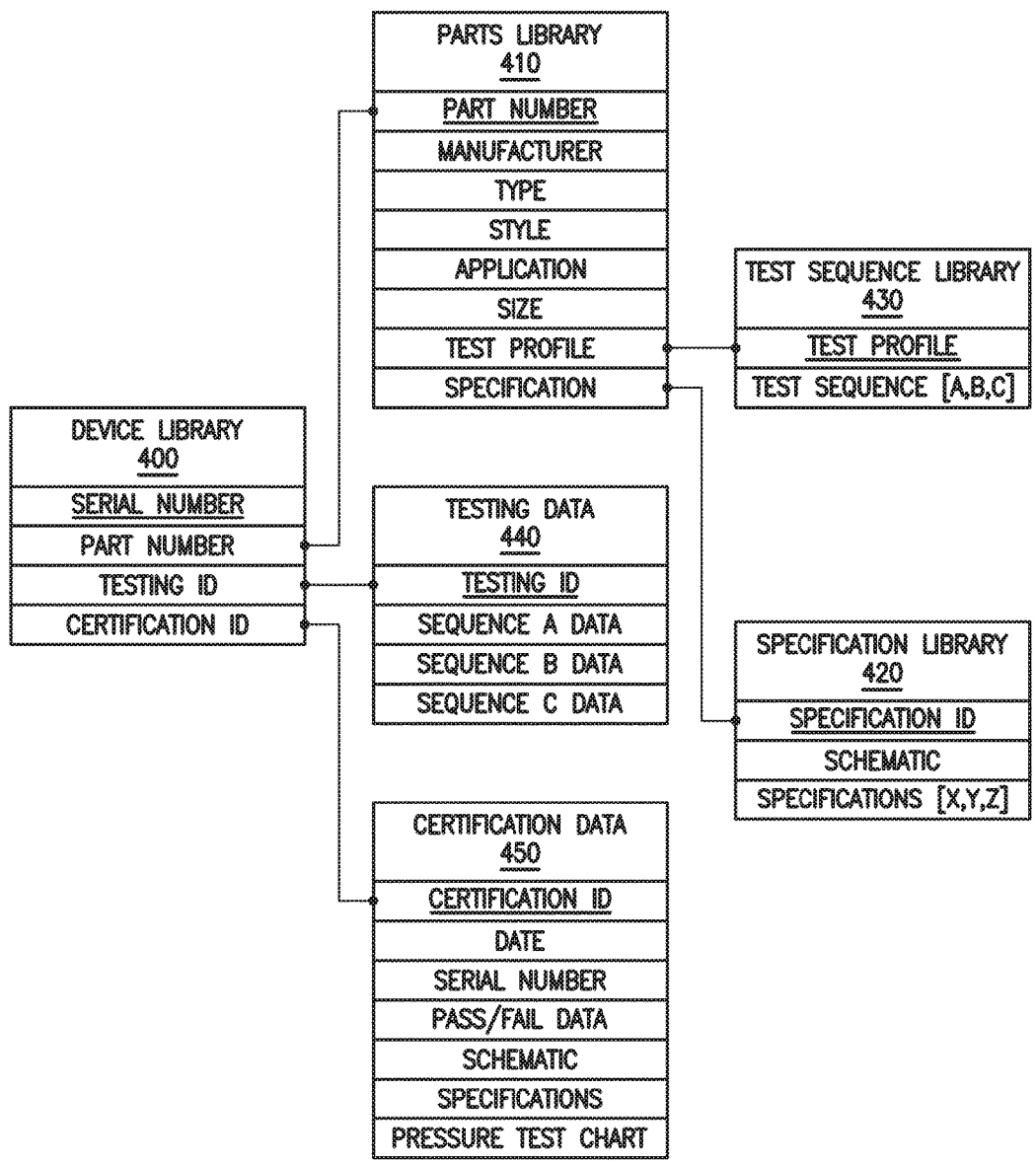
FIG. 4 is a database diagram illustrating exemplary data structures according to an embodiment of the present invention.

The database 170 can store therein a data structure or data structures relating to the well equipment devices 101 to be tested and all data generated during the execution of the testing module 211 and certification module 210, as is further discussed herein. In embodiments, database 170 is a relational database positioned to match data by using common data found between data sets, the data sets being organized according to tables 400, 410, 420, 430, 440, and 450 as seen in FIG. 4. As will be understood by those skilled in the art, FIG. 4 illustrates an exemplary set of data structures only, and there may be other unique table structures positioned to relate and match the data in manners commensurate with the embodiments of the present invention. Data stored in the database 170 may be updated as needed, for example, by a user with administrative access to the database to add new well equipment devices to the database as they become supported. As is described further herein with relation to the computer program products, database 170 can be positioned to store data in tables relating to the unique device tested 400, parts in a parts library 410, test specifications in a test specification library 420, test sequences in a test sequence library 430, test data in a test data repository 440, and certificate data in a certificate data repository 450. And as is described further herein, the database 170 is positioned to match common data appearing in the foregoing tables.

Testing Apparatus 110

As shown in FIG. 1 and FIG. 2, the plurality of testing apparatus 110 are in communication with the central management server 100. The plurality of testing apparatus 110 perform testing operations under the control of the central management server 110 and provide tools or devices to gather testing data 440 as shown in FIG. 4, i.e., the data that serves as the basis for the certification. In embodiments, the plurality of testing apparatus 110 at least includes an ultrasonic wall thickness meter ("UT meter") and a pressure test pump having a transducer. The plurality of testing apparatus 110 can include any other device or unit capable of being employed either manually or under automated control by the central management server 100 to interact with the well equipment device 101. Other testing apparatus 110 can include, for example, digital calipers. A local user may employ embodiments of the present invention, for example, by positioning the frac iron to be tested 101 in a testing station adapted for the test performed, and by manually configuring the frac iron 101 to safely and effectively interact with the testing apparatus 110 for the intended test.

Although shown as separate blocks in FIG. 1, the testing interface 150, which can be a personal computer (PC), can be connected to a peripheral testing apparatus 110 to control or collect data from a testing apparatus 110 connected as a peripheral to an input/output unit of the PC. The combination of the testing apparatus 110 and a PC may be referred to, collectively, as a testing apparatus 110. PC or testing interface 150 can connect to a peripheral testing apparatus 110 via any connection type known to those in the art, such as a Universal Serial Bus connection (USB), and such connection may include analog inputs and digital inputs, wired and wireless, and including analog-to-digital converters and amplifiers for digital inputs.

The plurality of testing apparatus 110 and a PC incorporated with a peripheral testing apparatus 110 can be a mobile unit or units having remote or wireless connectivity to central management server 100 using any protocols or standards known in the art, including Wi-Fi, GSM, and WIMAX, for example. Mobile units may also be synchronized with central management server through periodic wired or wireless connections when returning from field use. The PC can be, for example, any suitable PC known in the art and is preferably a Panasonic® Toughbook® or other portable, notebook, laptop, or tablet computer preferably designed to withstand vibration, drops, spills, extreme temperature, and other rough handling and conditions common to industrial use.

The UT meter can be, for example, an Olympus® MG2DL, or any similar UT meter known in the art. The UT meter can include, for example, features such as B-scan, gain adjust, auto sensitivity optimizations, echo-to-echo, differential mode, hi-low alarm, and live A-scan. The UT meter can also include a file-based alphanumeric data logger and an interface program for transferring data bi-directionally to and from a PC. The testing apparatus 110 can include a PC, such as described above, for enabling data and control functions of a peripheral testing apparatus 110 such as a UT meter.

The pressure test pump and transducer can be any suitable pressure test pump known in the art. Preferably, embodiments of the invention employ an X45 series model 345 Viatran® test and control pressure sensor, which can, for example, operate in the range of 0-100,000 psi with output in the range of 4-20 mA. As is known in the art, the testing apparatus 110 can include a control interface such as a programmable logic controller (PLC) for communication with and control of the pressure test pump and transducer.

Testing User 151 and Testing Interface 150

As described above, a testing user 151 may employ embodiments of the present invention, for example, by positioning the frac iron to be tested 101 in a testing station adapted for the test to be performed, and will manually configure the frac iron 101 to safely and effectively interact with the testing apparatus 110 for the intended test. In other embodiments, the testing user may perform testing operations according to instructions provided by the central management server 110 and displayed, for example, on the testing interface 150. The testing user 151 may provide the means of manually gathering testing data 440 as shown in FIG. 4, i.e., the data that serves as the basis for the certification. Testing operations, as described above with reference to the testing apparatus 110, may be systematic, manual, or hybrid systematic/manual. For example, a sequence of testing operations for testing wall thickness of the frac iron may include systematic test operations to be performed by a testing apparatus 110, such as a UT meter, and manual operations to be performed by a testing user 151, such as using digital calipers to measure wall thickness or other dimensions of the frac iron, as can be seen in FIGS. 15-16, for example. Likewise, other sequences of testing operations may be fully manual, such as the mag particle test discussed further herein.

Also as described above, the testing interface 150 may be a PC, which may be any desktop, laptop, notebook, tablet, or portable computer known to those in the art. As is known the art, the testing interface 150 can include any number of peripheral devices to interact with the testing user 151, including a keyboard, mouse, control stick/joystick, and memory reader for receiving data input and a display screen, printer, and local storage device for outputting or storing data. Furthermore, embodiments of invention have a testing interface with a touch-sensitive screen (e.g., using a stylus) for interactive display/input so that users can select parts responsive to viewing them on the display of the testing interface 150 and thereafter performing testing operations responsive to the selection, in communication with the testing module 210. The testing interface 150 may connect with the central management server 100 via any communications interface known to those of skill in the art, wired or wireless, and is preferably a secure local Intranet or other authenticated and encrypted communications network, including a VPN over the Internet.

Certificate 500

FIG. 5 sets forth an exemplary certificate 500 generated responsive to embodiments of the present invention. The certificate 500 relates to data stored in the database 170, for example, the certificate data 450 as shown in FIG. 4. The certificate 500, as is appreciated by those skilled in the art, can be a paper document printout or an electronic document in a format such as Adobe® Portable Document Format (.PDF), Microsoft® Word (.DOC or .DOCX), or a similar format. The certificate 500, for example, can be a paper document printout, as it is the custom in drilling and fracing operations for a paper document printout of a certificate to be presented to company personnel when well equipment is brought on-site in field operations. The company personnel takes possession of the physical document and reviews the testing parameters and testing results documented thereon to verify the quality of the equipment brought on site.

The certificate 500 can reference the well equipment device 101 by a unique device identifier, such as the serial number 501, which can relate to data stored in database 170 in the device information table 400. The certificate 500 can contain a summary indication as to whether certain test sequences were graded as a "PASS" or a "FAIL" 502. The grading operation, for example, can be performed by a certification module 220 computer program product operating on the central management server 100. The PASS or FAIL grading 502 can relate to data stored in the database 170, for example, the certificate data 450 and the testing data 440 shown in FIG. 4. The certificate 500 can also contain a summary or other rendering of testing data responsive to testing operations being performed on the well equipment device 101, for example, a graphical representation of a pressure test 503. Graphical representation 503 can relate to data stored in the database 170 in the certificate data table 450 and the testing data table 440.

The certificate 500 can also contain a summary indication as to measured qualities of the selected well equipment device 101 and their relation to the qualities demanded by the test specification. For example, measured wall thickness value 505 appears adjacent to demanded wall thickness value 506. Additionally, drawing 504 shows a graphical representation of the parameters measured according to the test specification, as referenced by letter key (e.g., "A," "B," and "C").

In certain embodiments of the present invention, a certificate can be stored in a proprietary data table format so that a lightweight electronic copy of the certificate, and an "RFID certificate" can be stored directly onto RFID tag 135 attached to the selected well equipment 101. For example, as understood by those skilled in the art, the RFID certificate can be written to an RFID tag 135 attached to the well equipment so that the certificate can be readily accessed in the field using an RFID reader device 130 capable of recognizing the proprietary data table format. The RFID certificate can include all fields available on the paper certificate 500, including device identifier 501, pass or fail grading 502, tabular summary or rendering of test data 503, drawing 504, measured values 505, and demanded values 506. The tabular summary or rendering 503 and the drawing 504 can be encoded, for example, using lightweight vector-based primitive formats. Also, RFID certificate will allow new schemes for protecting certificate data heretofore unavailable for field use, for example, by having individual cells in the table that are protected according to user access schemes such as read-only, read-write, or no access. For example, the serial number and the certification may be read-only to all; the certificate data may be read-only to many and read-write to few; and custom fields may be user-configurable.

Testing Module 210

As is shown in FIG. 2, the testing module 210 may be a computer program product stored in the memory 240 on the central management server 100 and operable on the processor 251 thereof. Computer program product 210 contains instructions that are operable on the processor 251 that cause the testing module 210 and the central management server 100 to perform the operations discussed further herein.

The testing module 210 can interact with the processor to receive or transmit data, instructions, and other information from or to any of the devices connected to I/O 252. In embodiments discussed below, the testing module 210 at least interacts with the testing interface 150, testing apparatus 110, RFID reader 130, and database 170. Although testing interface 150 has been described to be a personal computer (PC), testing interface 150 can also be implemented in whole or in part as a user terminal interface on the central management server 100 itself, or using a keyboard, display, or media inputs and outputs connecting to the I/O 252. Testing interface 150 can also be a lightweight graphical user interface (GUI) operable over a web browser and viewable on any browser-enabled device, such as a PC, smart phone, or other equipment having a processor and computer functionality. Testing interface 150, for example, can receive user-selected identifiers or other user-selected values or parameters from a testing user as will be described in further detail below and can display identifiers, values, parameters, and other specification data, for example, as can be shown with reference to the selection, input, or display fields 900, 1000, 1100-1101, and 1200-1205 in FIGS. 9-12.

Other user selection, input, or display fields are also shown elsewhere in FIGS. 13-25, as will be apparent to those having skill in the art.

The testing module 210 can receive a device identifier for a selected well equipment device 101, the selected well equipment device being a well equipment device positioned to undergo testing and certification, i.e., in the testing warehouse, on a testing trailer, or otherwise positioned at a testing station. In the embodiment of the present invention, only one well equipment device is tested at any given time using any particular testing apparatus 110. It is possible, however, that multiple instances or threads of the testing module 210 can run on the processor 251 concurrently, with each instance being directed to the testing of a different piece of well equipment positioned for testing. It is also possible that multiple testing apparatus 110 of the same type may be employed to perform the same test sequence in simultaneous testing operations performed on multiple well equipment devices 101.

Figure 6A:
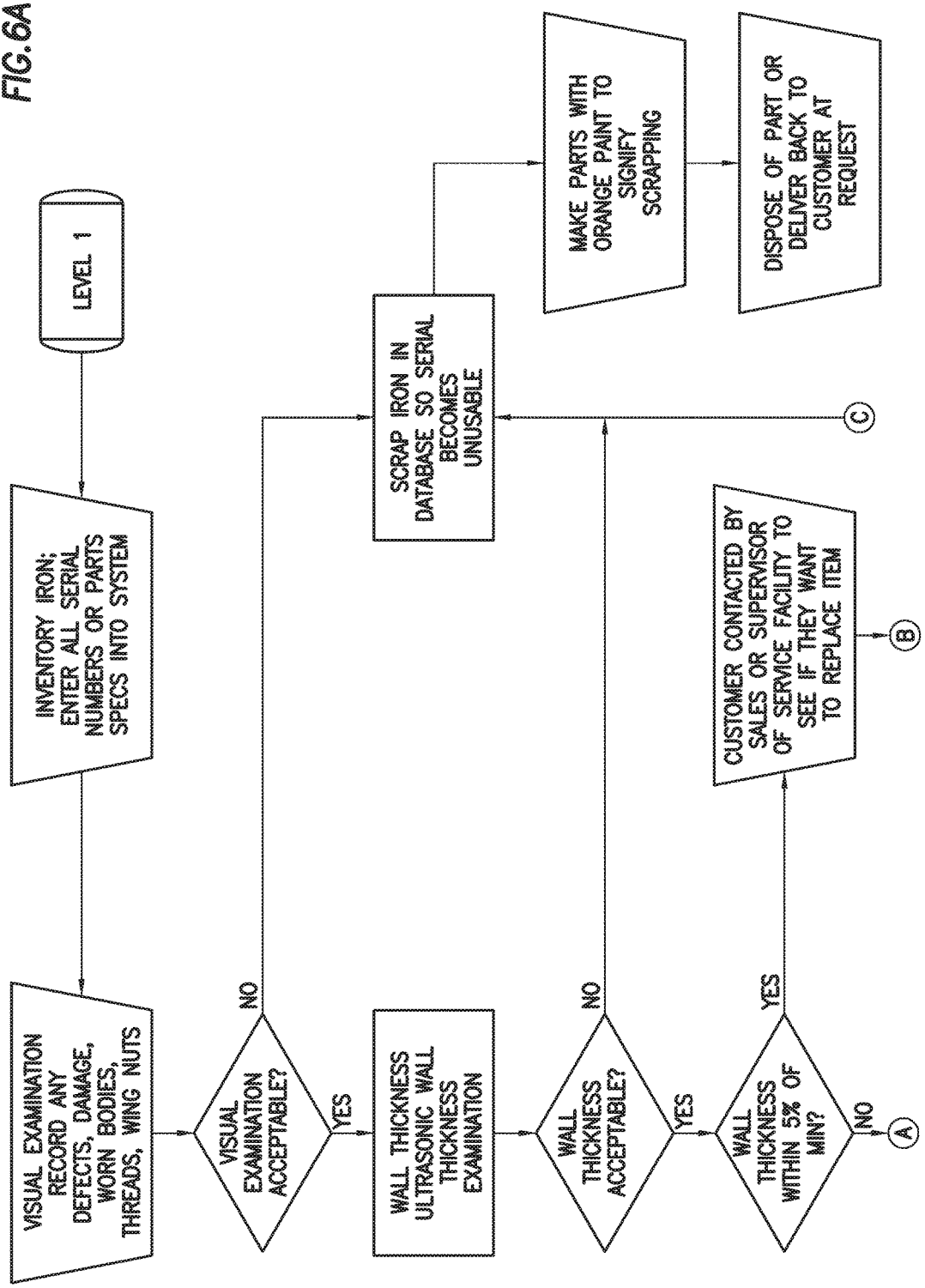
FIG. 6A is a flowchart illustrating a first portion of a first process flow according to embodiments of the present invention.
Figure 6B:
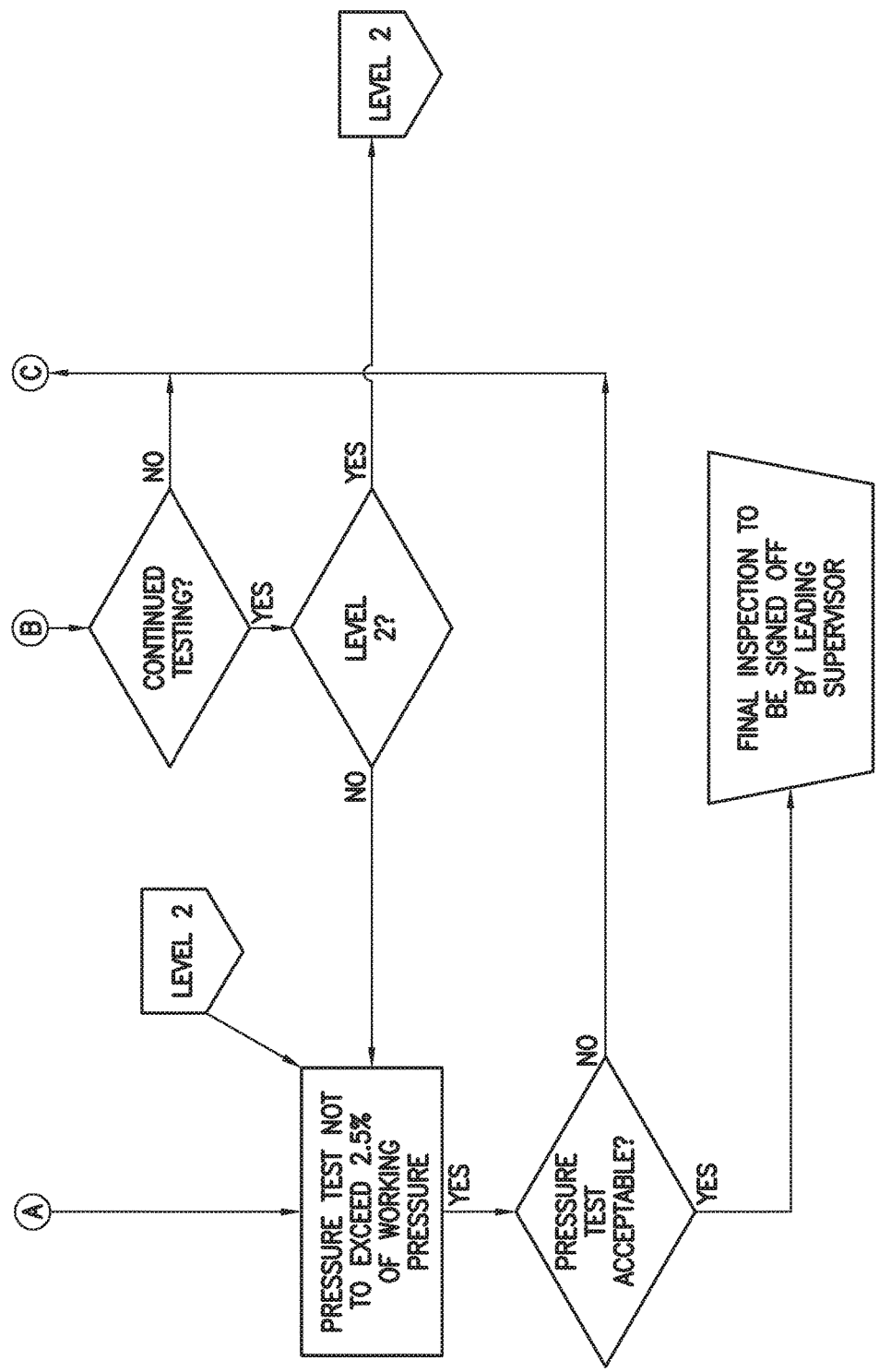
FIG. 6B is a flowchart illustrating a second portion of the first process flow according to embodiments of the present invention.

The testing module 210 can receive a serial number as a device identifier as shown in FIG. 6A. The testing module 210 can receive a serial number as a device identifier, for example, by receiving input from the testing interface 150 as entered therein by a testing user 151. The testing module 210 can also receive a device identifier, such as a serial number, from a peripheral device, such as an RFID reader 130, as is discussed further herein.

Figure 9:
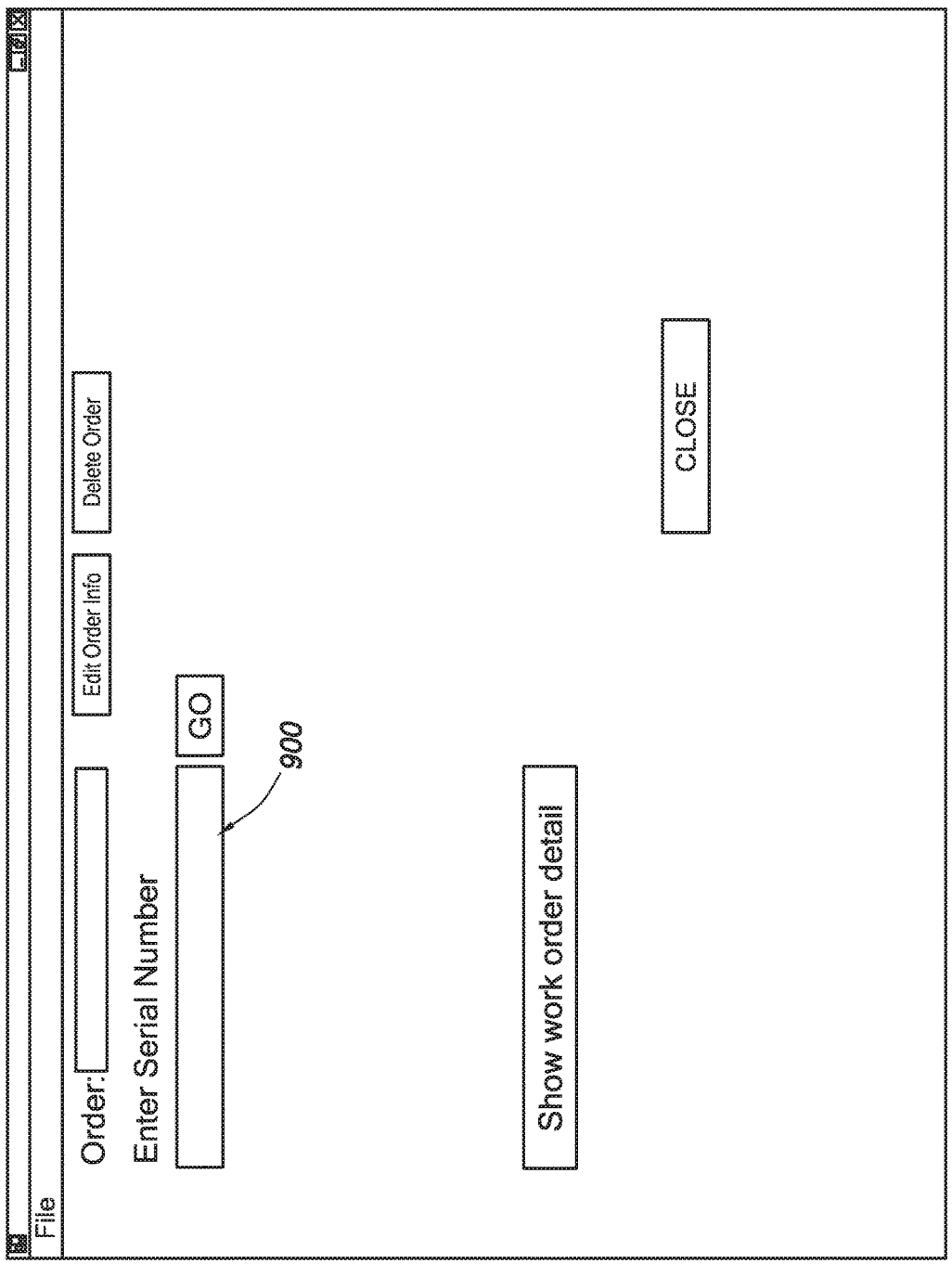
FIG. 9 is a first testing interface display according to embodiments of the present invention.
Figure 10:
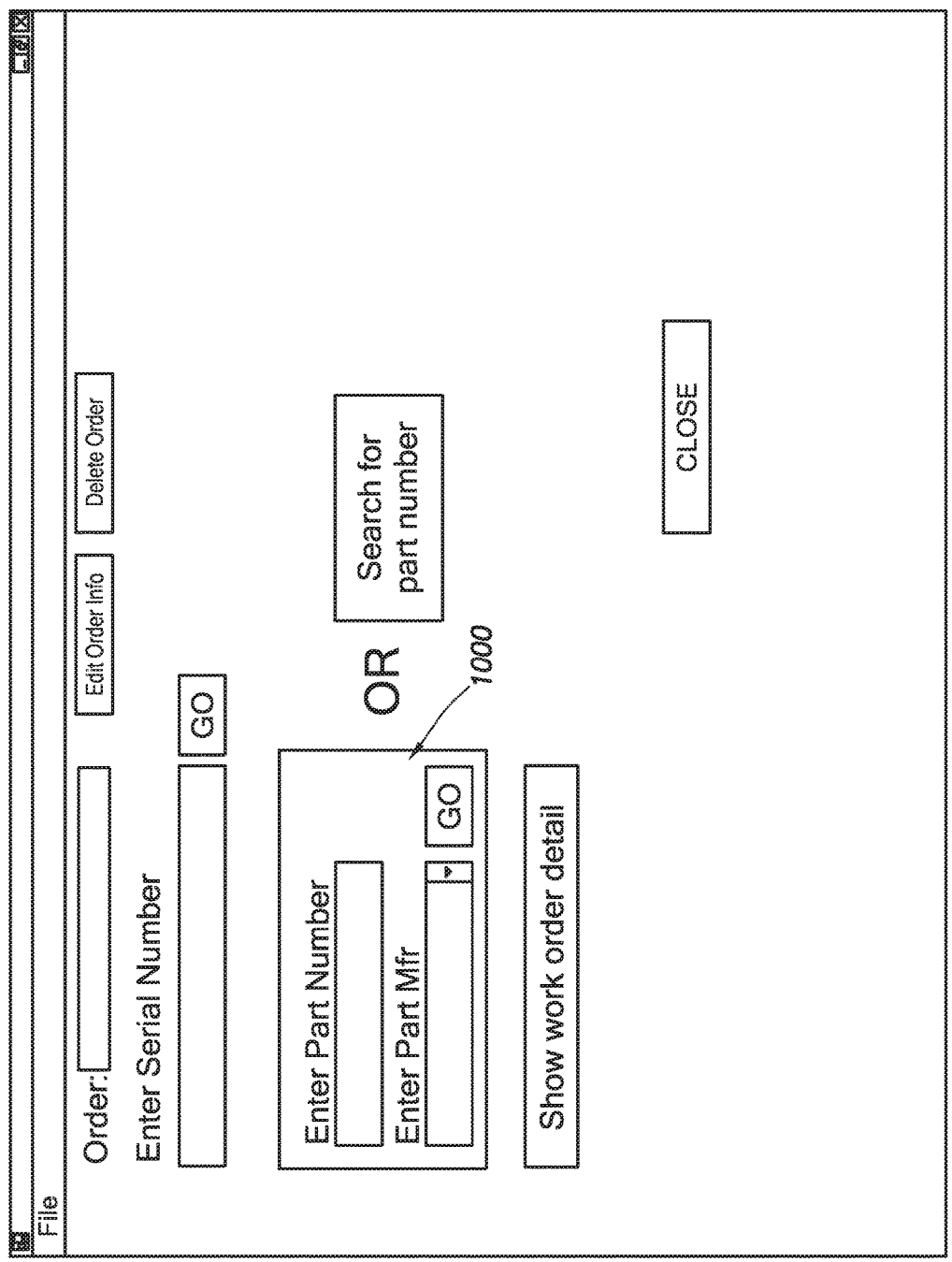
FIG. 10 is a second testing interface display according to embodiments of the present invention.
Figure 11:
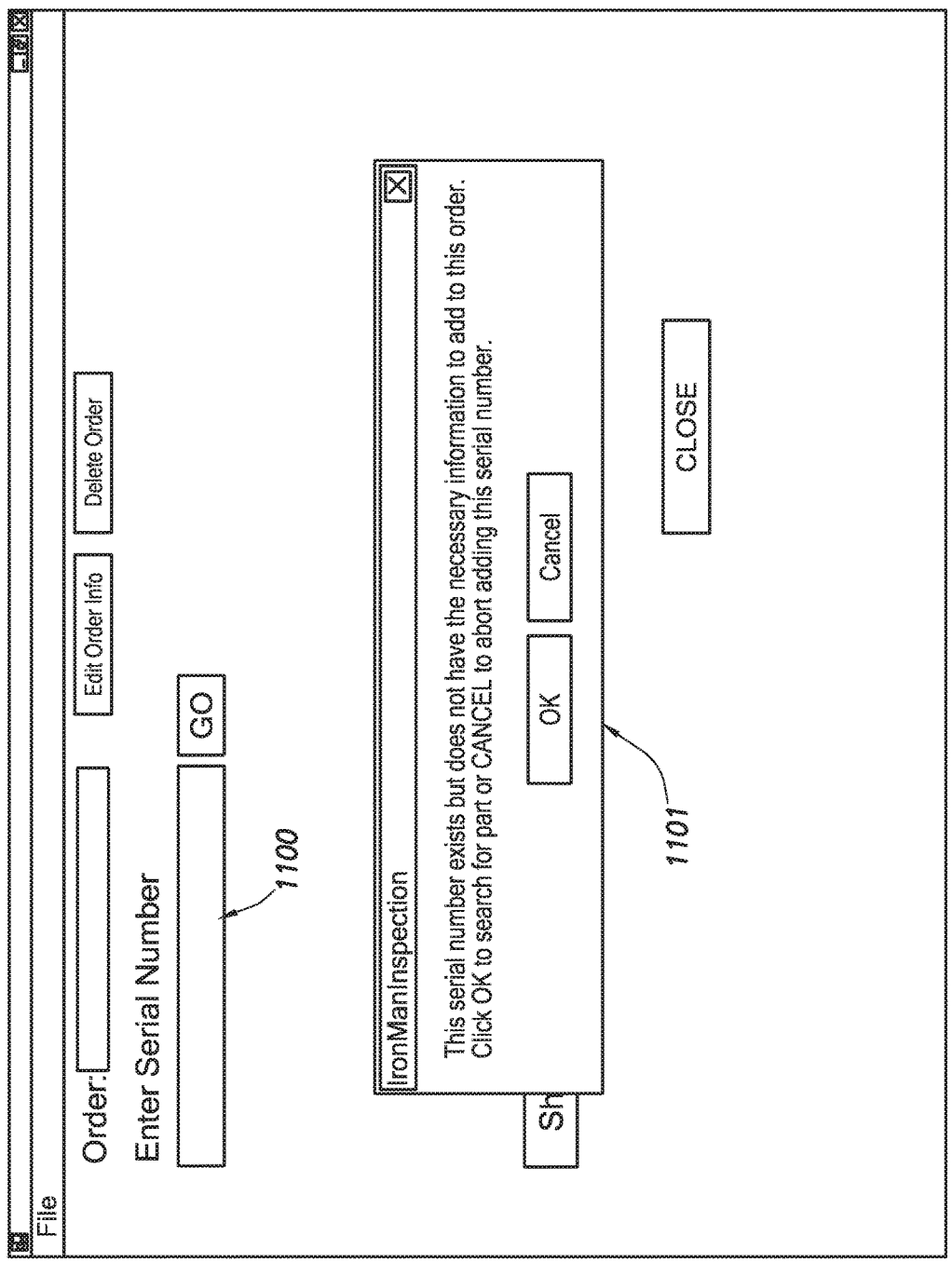
FIG. 11 is a third testing interface display according to embodiments of the present invention.
Figure 12:
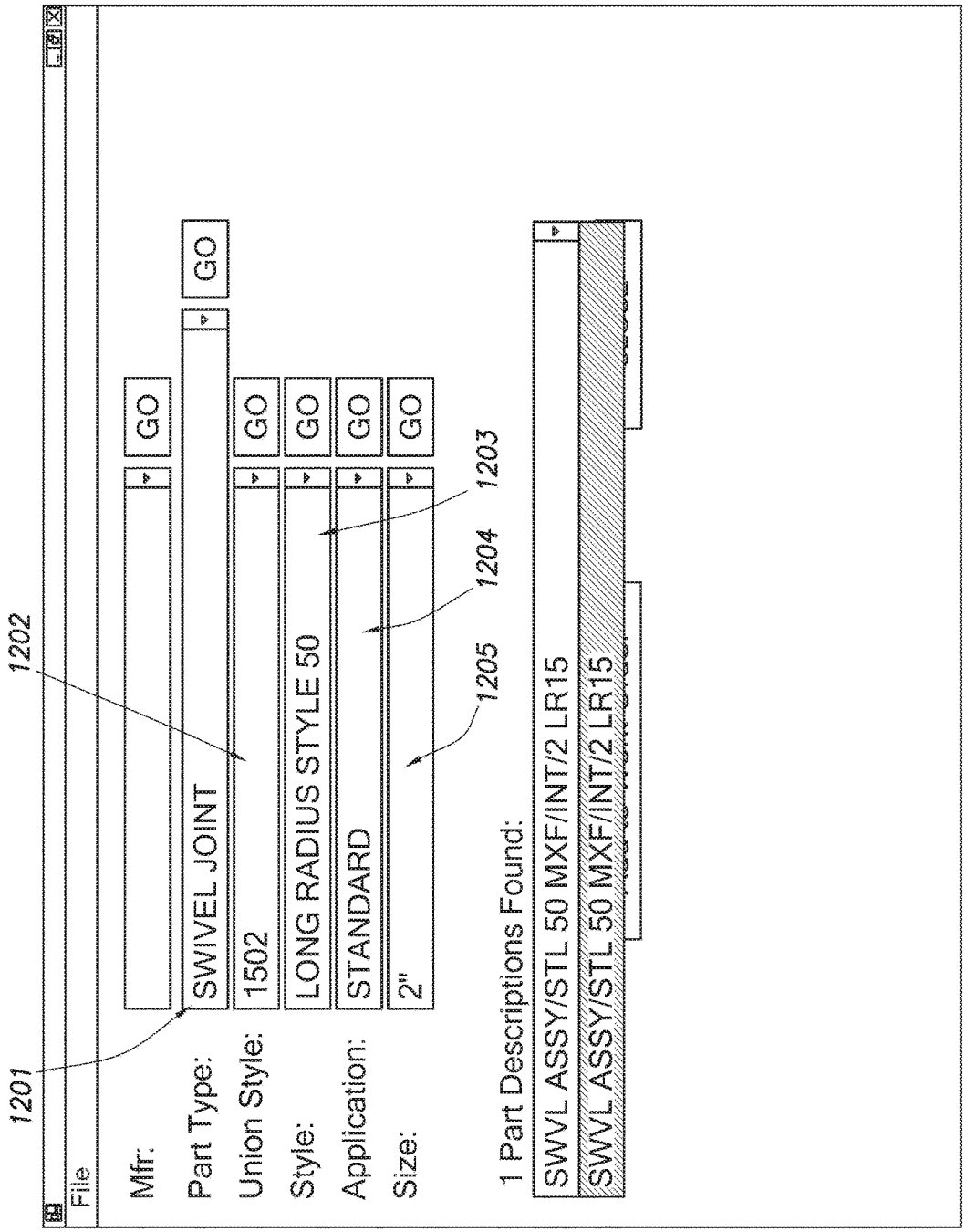
FIG. 12 is a fourth testing interface display according to embodiments of the present invention.

The testing module 210 can identify the selected well equipment device responsive to the device identifier as shown in and match the selected well equipment to: (i) device library information as shown in FIG. 4 at table 400, the device library information including a part number, and (ii) a part library information at table 410 including type, test specification, and test profile. If the testing module 210 is unable to identify the foregoing information (i.e., the device has not yet been tested), then the testing module 210 can prompt the testing user 151 to enter information to identify the device as shown in FIG. 9. Once the testing module 210 has matched the device 101 to a part number, the testing module 210 can match the device to a test specification and a test profile as shown in FIG. 4 at tables 420 and 430. The test specification can be criteria to which the testing operations will be performed, for example, as specified by the manufacturer or the customer. Test specifications can include, for example, a series of benchmark parameters as shown in FIG. 5 at 506. Test specifications can also include, for example, a schematic associated with the series of parameters as shown in FIG. 5 at 504.

The test profile as shown in FIG. 4 at table 430 may be a plurality of test sequences that are to be performed upon the well equipment device. A test profile may indicate that certain test sequences shall be run on certain parts, but not on others. For example, test profiles may be defined by "levels" as set forth by the logical process flows shown in FIGS. 6A-9.

Level 1, as set forth in FIG. 6A, can include, for example, making an inventory of all iron and entering al serial numbers or parts and specifications into the system. Then a testing user can visually examine and record any defects, damage, worn bodies, threads, and wing nuts on the iron. If the visual examine is acceptable, the tester can proceed with a wall thickness test, as discussed further herein. If the visual examination is unsuccessful, the user can scrap the iron in the database, mark the part with orange paint, and return or destroy the iron so that it becomes unusable. If the wall thickness is acceptable, the customer can be contacted if the wall thickness is within 5% of the minimum value set forth in the testing specification. If not, the testing user can proceed to the pressure test. If the pressure test is acceptable, the final inspection to be signed off by leading supervisor. If continued testing is desired, the tester can proceed to Level 2 before performing the pressure test.

Figure 7A:
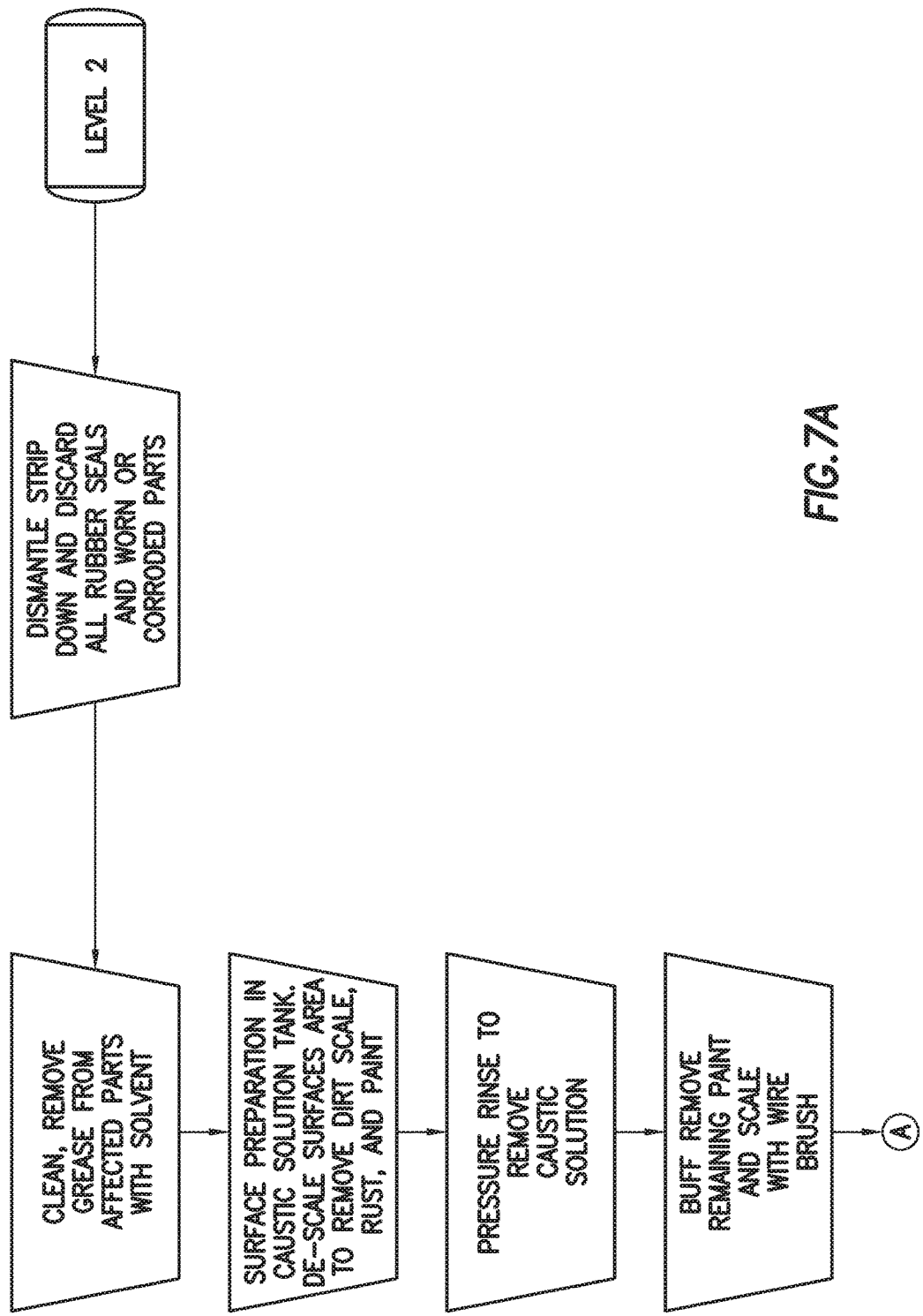
FIG. 7A is a flowchart illustrating a first portion of a second process flow according to embodiments of the present invention.
Figure 7B:
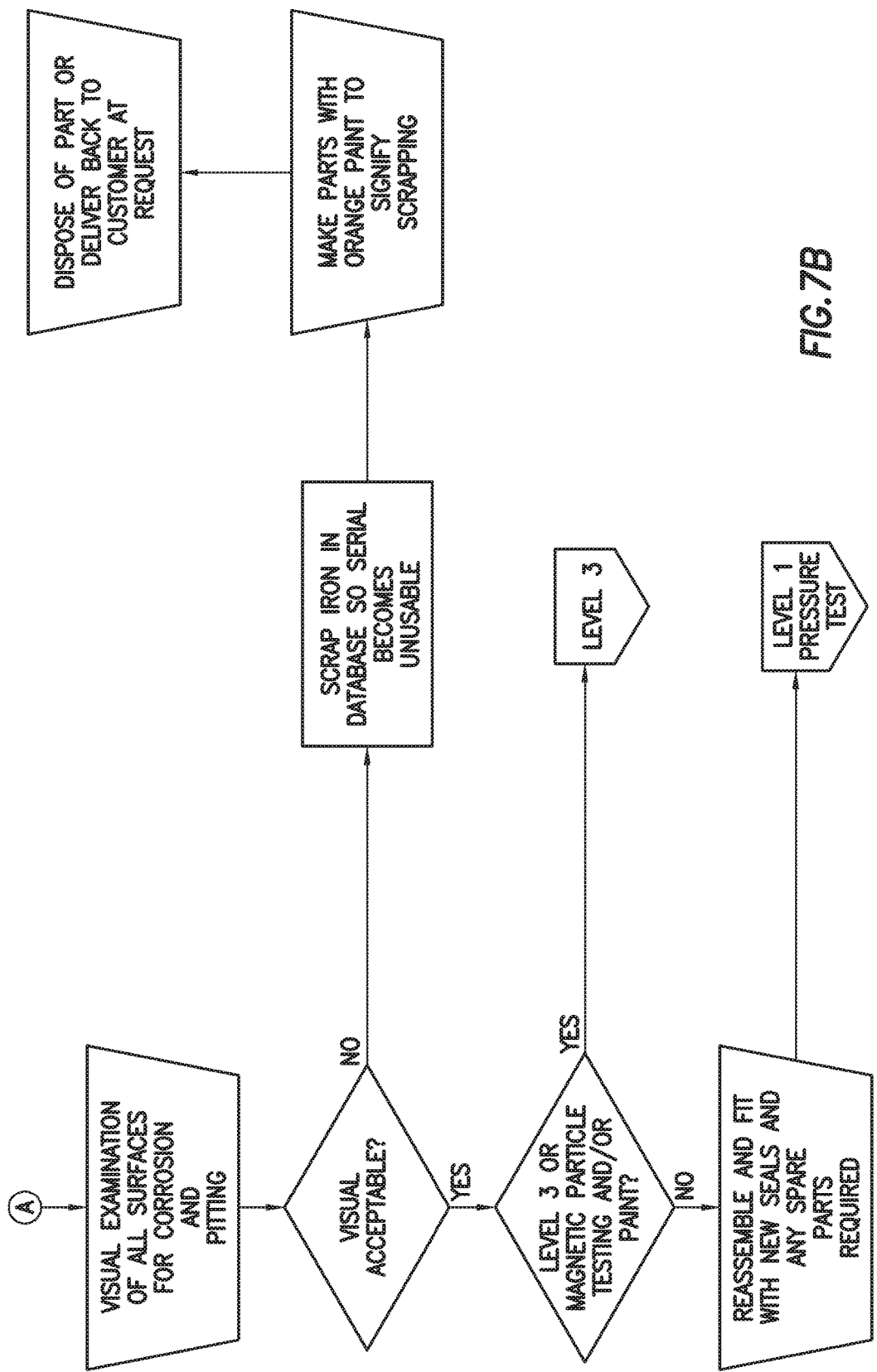
FIG. 7B is a flowchart illustrating a second portion of the second process flow according to embodiments of the present invention.

Level 2, as set forth in FIG. 7A, can include, for example, dismantling and stripping down and discarding all rubber seals and worn or corroded parts, then cleaning and removing grease from affected parts with solvent. Also, the testing user can perform a surface preparation in caustic solution tank, de-scale surfaces area to remove dirt scale, rust, and paint, and pressure rinse to remove caustic solution. The testing user then performs the visual examination as specified for Level 1, and may scrap the part also as specified for Level 1. If proceeding to Level 3 is acceptable, the testing user goes to Level 3 before performing the pressure test. Otherwise, the pressure test can be performed as specified for Level 1.

Figure 8A:
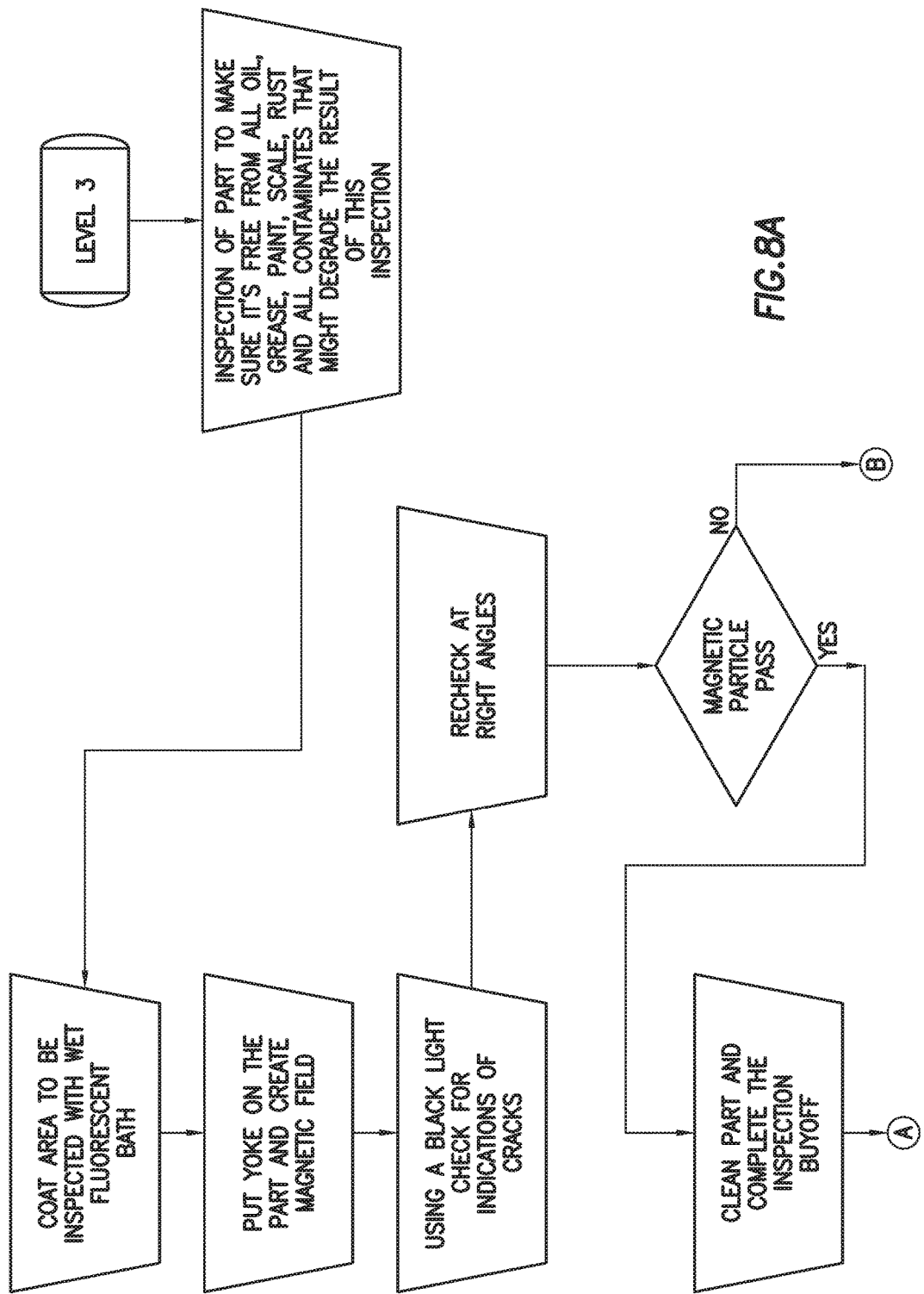
FIG. 8A is a flowchart illustrating a first portion of a third process flow according to embodiments of the present invention.
Figure 8B:
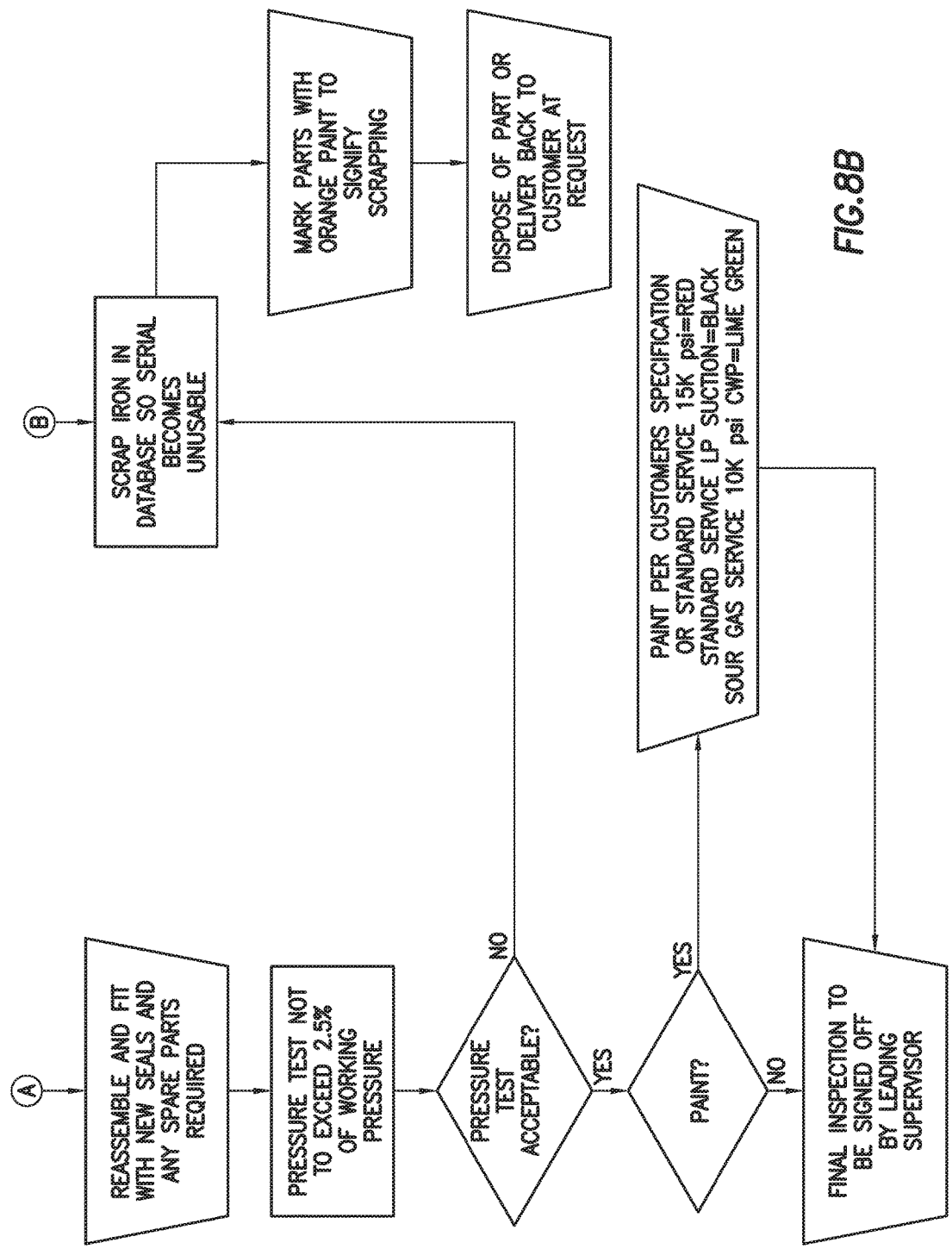
FIG. 8B is a flowchart illustrating a second portion of the third process flow according to embodiments of the present invention.

Level 3, as set forth in FIG. 8A, can include, for example, inspecting the part to make sure its free from all oil, grease, paint, scale, rust, and all contaminates that might degrade the result of this inspection. The testing user then coats area to be inspected with wet fluorescent bath and puts a yoke on the part to create magnetic field. The user can pass the part for the magnetic particle test if, using a black light to check for indications of cracks and rechecking at right angles, the user finds no indications of cracks. If the magnetic particle test fails, the user can scrap the iron in the database as set forth for Level 1. After cleaning the part and completing the inspection buyoff, the testing user can reassemble and fit with news seals and any spare parts required. Thereafter the testing user can perform the pressure test as specified for Level 1 and proceed to paint per the customer's specifications or according to standardized paint schemes as set forth in FIG. 8B. After painting, the supervising leader must sign off on the final inspection.

Figure 13:
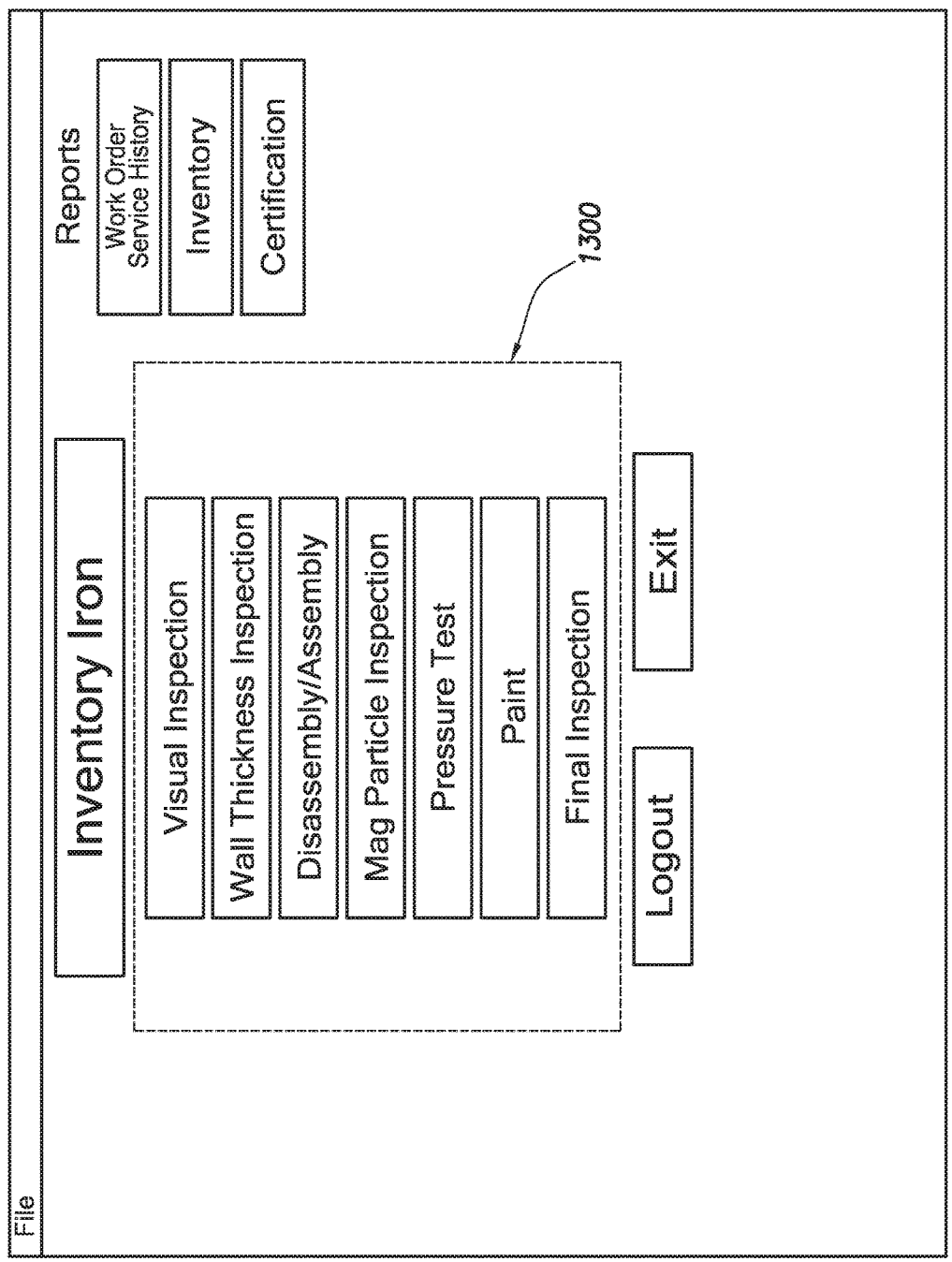
FIG. 13 is a fifth testing interface display according to embodiments of the present invention.

Test sequences 1300 can include, for example, visual inspection, wall thickness inspection, disassembly/assembly, magnetic ("mag") particle inspection, pressure test, paint, and final inspection. As shown in FIG. 13, test sequences available for the device 101, (i.e., available according to the test profile 430) can be displayed to the testing user 151 using the testing interface 150 so that the testing user 151 may select one of the available test sequences to be performed.

Test sequences as shown in FIG. 13 may correspond to one of a plurality of testing apparatus 110. For example, the test sequence "wall thickness inspection" corresponds to the UT meter testing apparatus 110 and the test sequence "pressure test" corresponds to the pressure test pump and transducer. Other test sequences shown in FIG. 13 may correspond to manual procedures; for example, the test sequence "visual inspection" corresponds only to operations to be performed by the testing user 151. Each test sequence, as shown in table 440 of FIG. 4, corresponds to a sequence of testing operations to be performed upon the well equipment device 101.

Once the testing interface 150 displays the plurality of test sequences 440 available for the well equipment device, the testing user 151 can select a test sequence to be performed. The test sequence should correspond to the testing user positioning the selected well equipment device so that the testing apparatus 110 can perform the testing operations. For example, if the testing user 151 has selected the pressure test sequence, the testing user must also ensure that the appropriate testing apparatus 110 (e.g., the pressure pump and transducer) is positioned upon the selected well equipment device so that the test can be properly performed.

Figure 14:
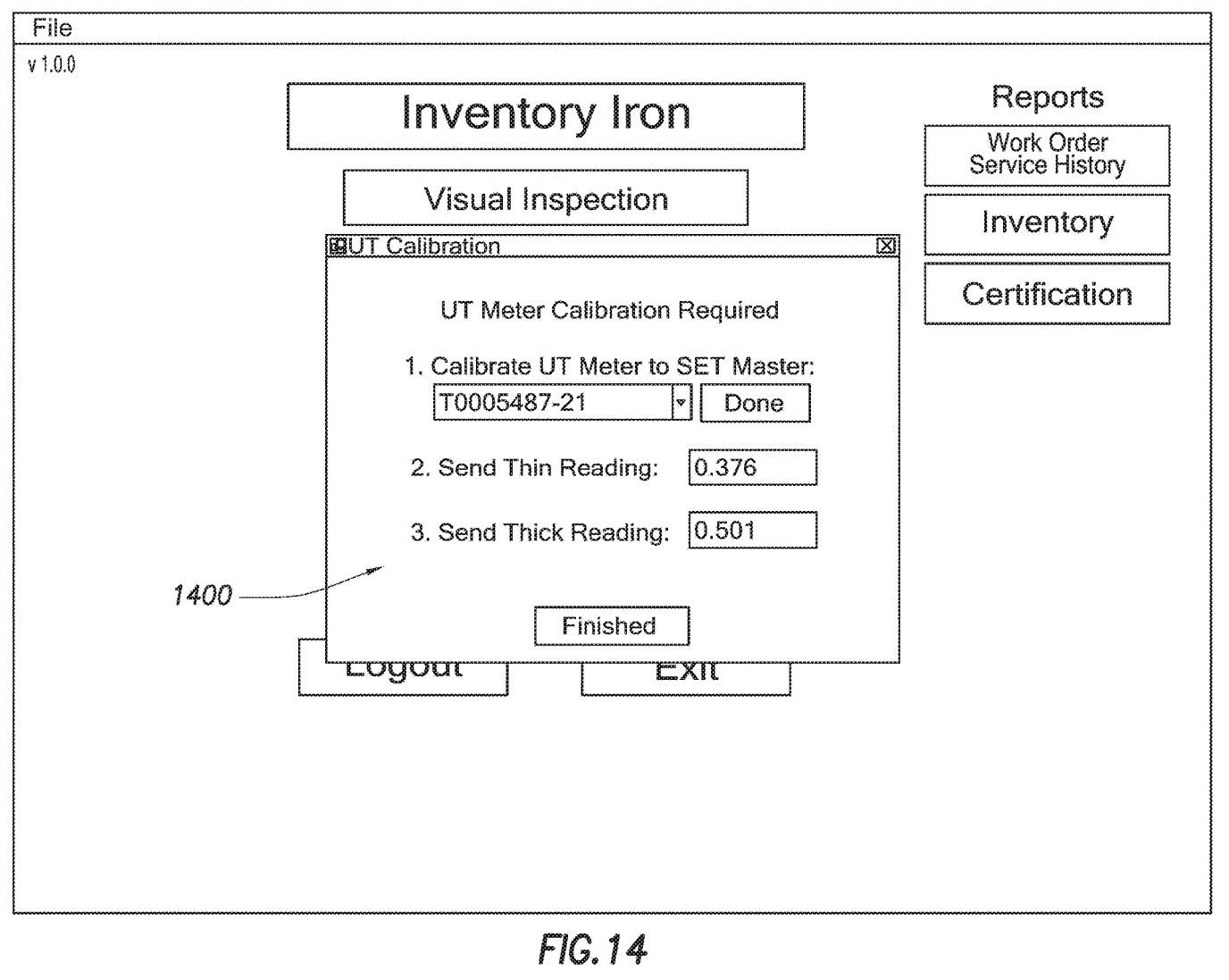
Figure 15A:
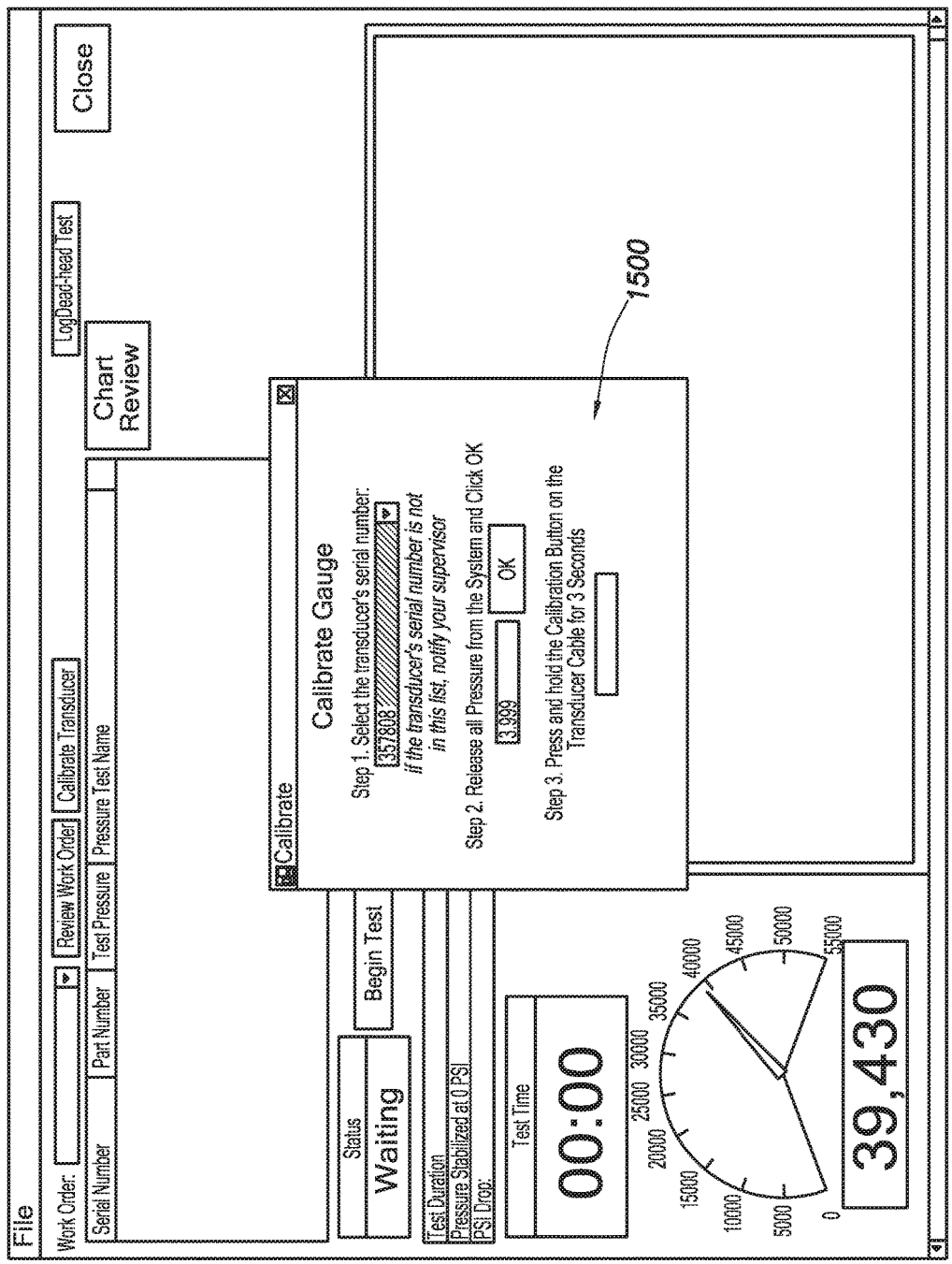
FIG. 15A is a seventh testing interface display according to embodiments of the present invention.
Figure 15B:
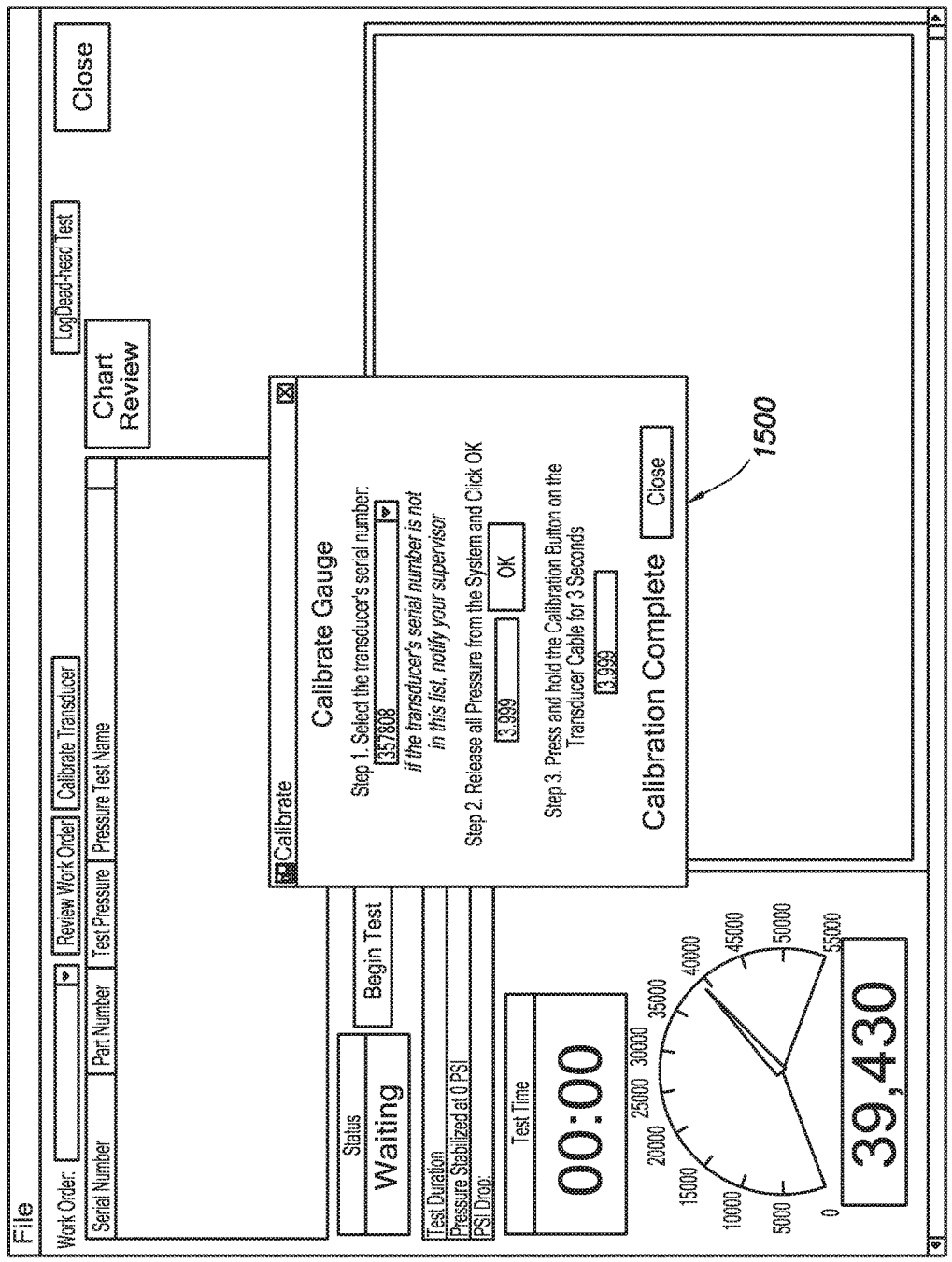
FIG. 15B is a variation of the seventh testing interface display according to embodiments of the present invention.
Figure 16:
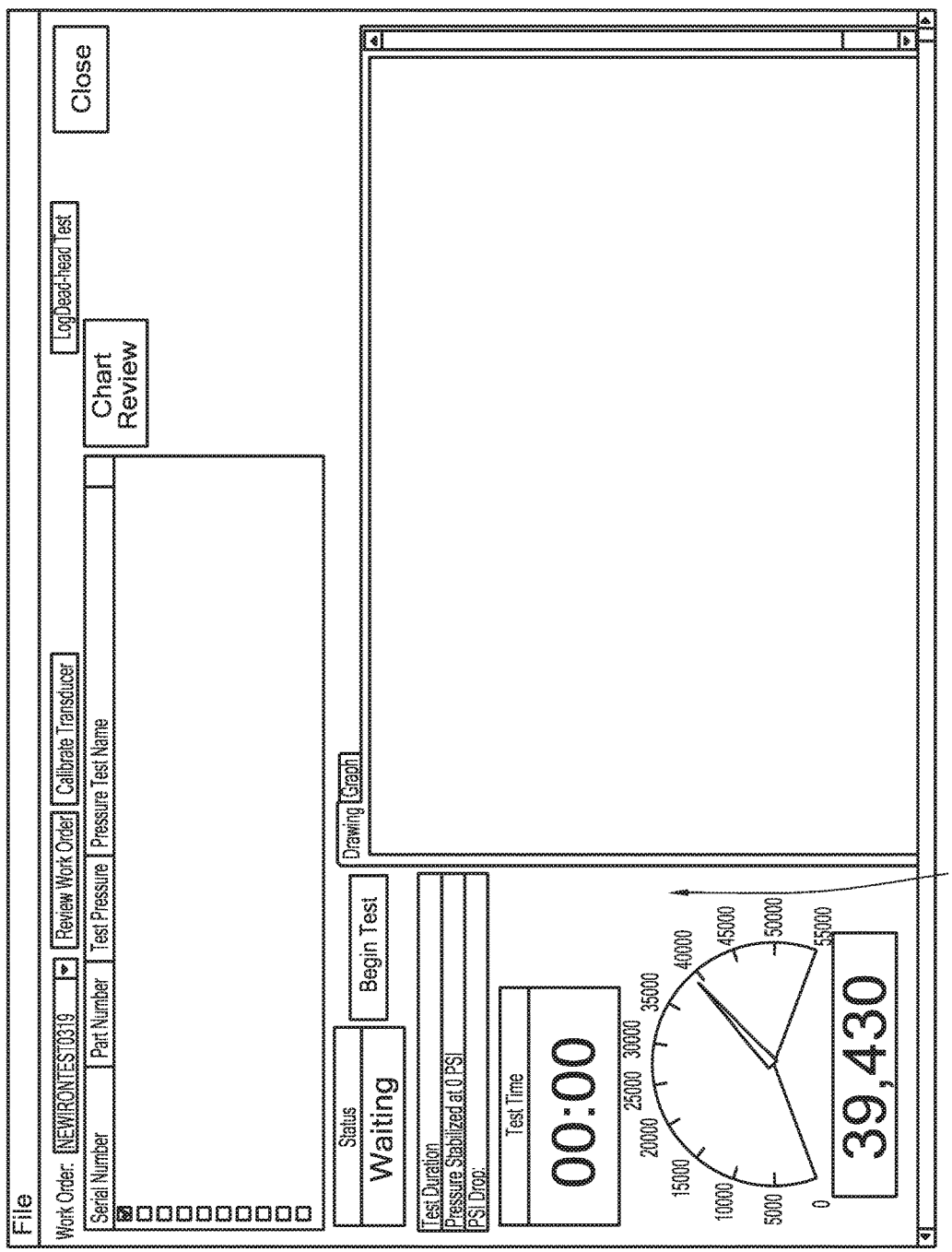
FIG. 16 is a eighth testing interface display according to embodiments of the present invention.

If the testing user 151 has selected the pressure test sequence or the wall thickness inspection sequence, the testing module 210 will calibrate the testing apparatus 110 as shown in FIG. 14 and FIGS. 15A and 15B. In certain embodiments, the calibration 1400, 1500 can be performed responsive to the tolerances as specified in the test specification 420. Calibration can be performed, for example, by shoring a transducer of the testing apparatus 110 to return a rated pressure value or a baseline calibration setting by the manufacturer, as will be understood by those skilled in the art. Embodiments of the present invention can receive the baseline calibration setting returned and configure a calibration setting responsive thereto.

Figure 17:
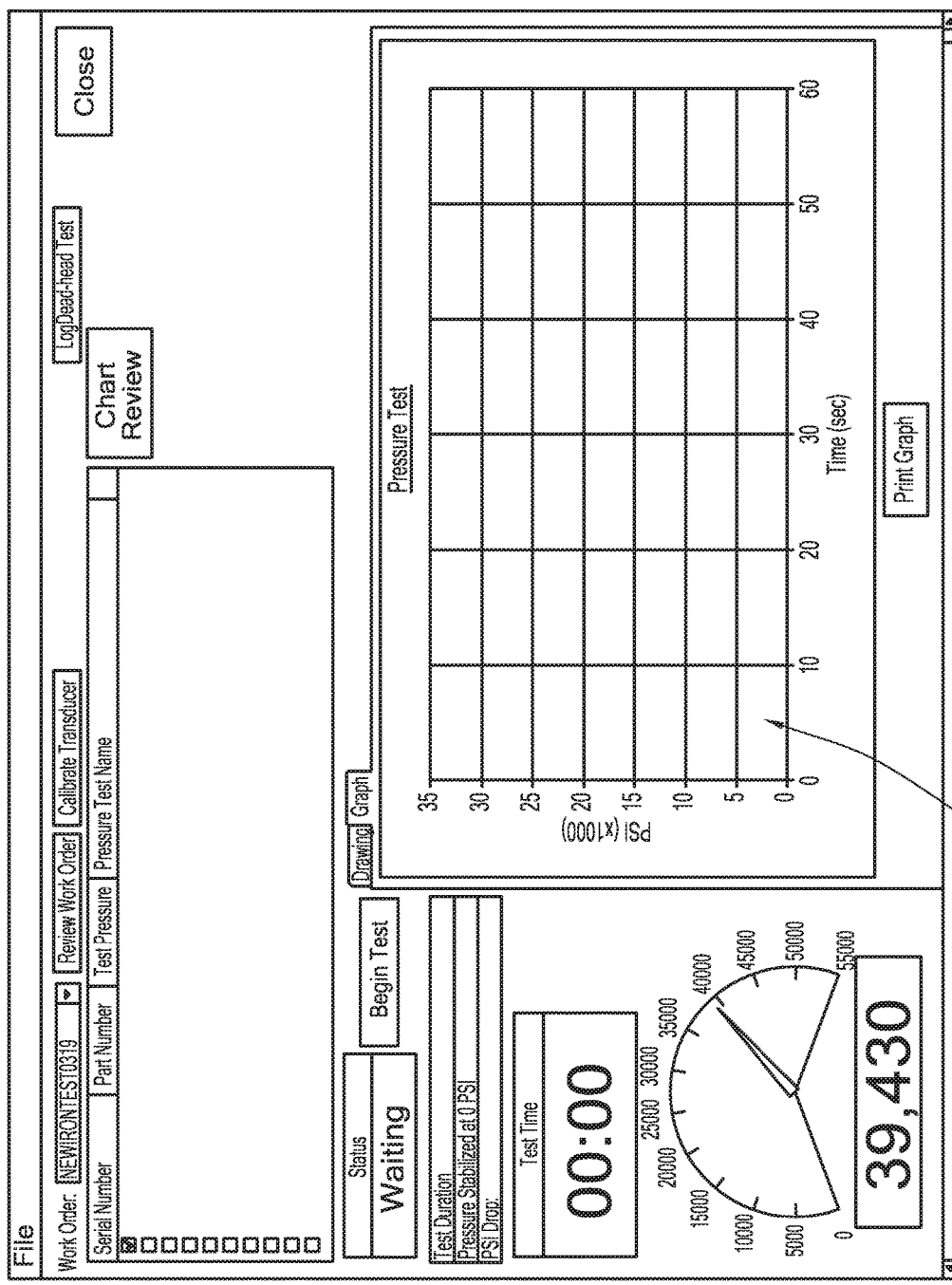
FIG. 17 is a ninth testing interface display according to embodiments of the present invention.

According to certain embodiments of the present invention, the testing module 210 systematically controls the performance of testing operations in certain test sequences. For such testing modules having full systematic control of performing the testing operations, e.g., the pressure test sequence, the testing user 151 can initiate the performance of the testing operations to be controlled by the central management server 100, as shown at control deck 1600 in FIG. 16. The testing module 210 can control the corresponding testing apparatus 110 for the selected testing sequence so that the corresponding testing apparatus 110 performs the sequence of testing operations upon the selected well equipment device 101. For example, the pressure test sequence can be performed responsive to the pressure criteria set forth in the test specification. As shown in FIG. 17, the pressure test proceeds systematically as shown in test chart 1700 and the test module controls the performance of a pressurization of the selected well equipment device 101 for a preselected period of time, for example, as specified in the test specification.

Figure 18:
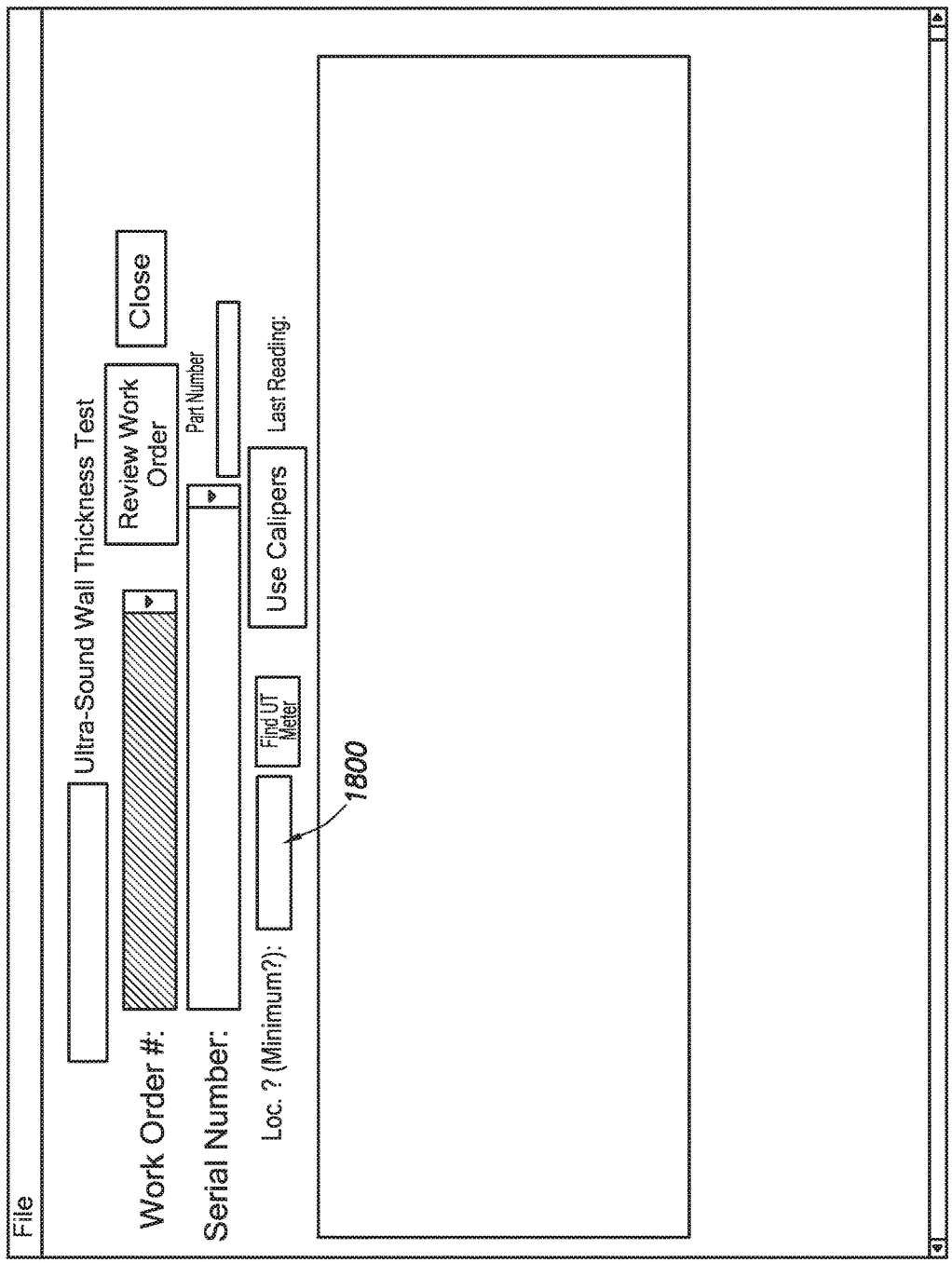
FIG. 18 is a tenth testing interface display according to embodiments of the present invention.
Figure 19:
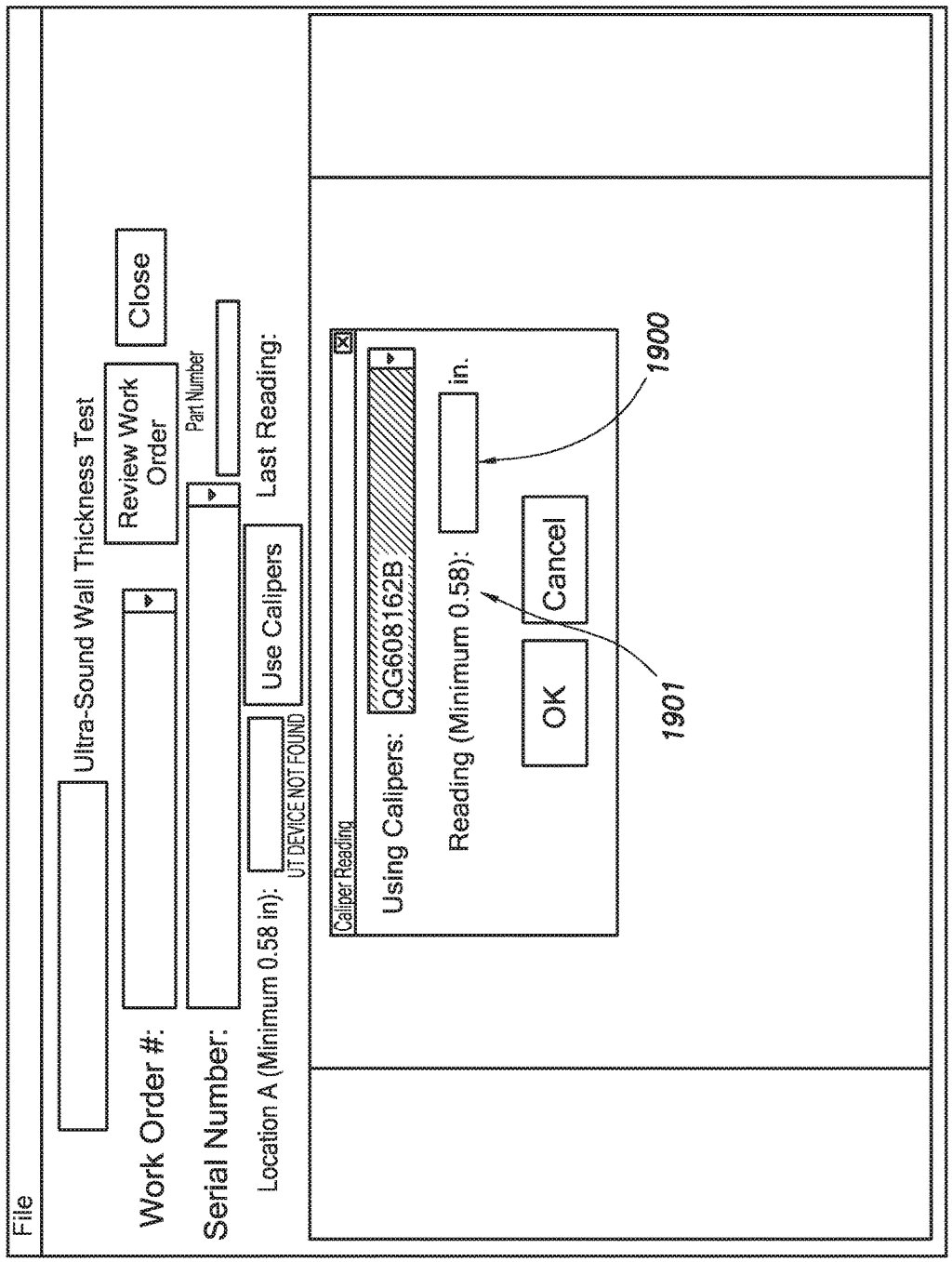
FIG. 19 is a eleventh testing interface display according to embodiments of the present invention.

In further embodiments of the present invention, the testing module 210 systematically controls the performance of some testing operations and requires manual performance of other testing operations ("hybrid systematic/manual"). For testing modules having hybrid systematic/manual performance of testing operations, such as for wall thickness inspection, the testing user 151 can initiate the performance of the testing operations to be controlled by the central management server 100, and the central management server 100 can control the testing apparatus 110 as discussed above with respect to fully systematic testing. Also, the testing module 210 can prompt the testing user 151 with instructions for the testing user 151 to perform testing operations pursuant to the test specification. As shown in FIG. 18 and FIG. 19, the thickness at "Location A" can be measured and input 1800, 1900 either by the UT Meter or by the testing user 151 manually measuring Location A with a digital caliper. The testing module 210 transmits the schematic from the test specification to the testing interface 150 so that it may be displayed 1901 to the testing user 151 and instructs the testing user 151 how to perform the test operations with respect to the information set forth in the schematic and test specification.

Figure 20:
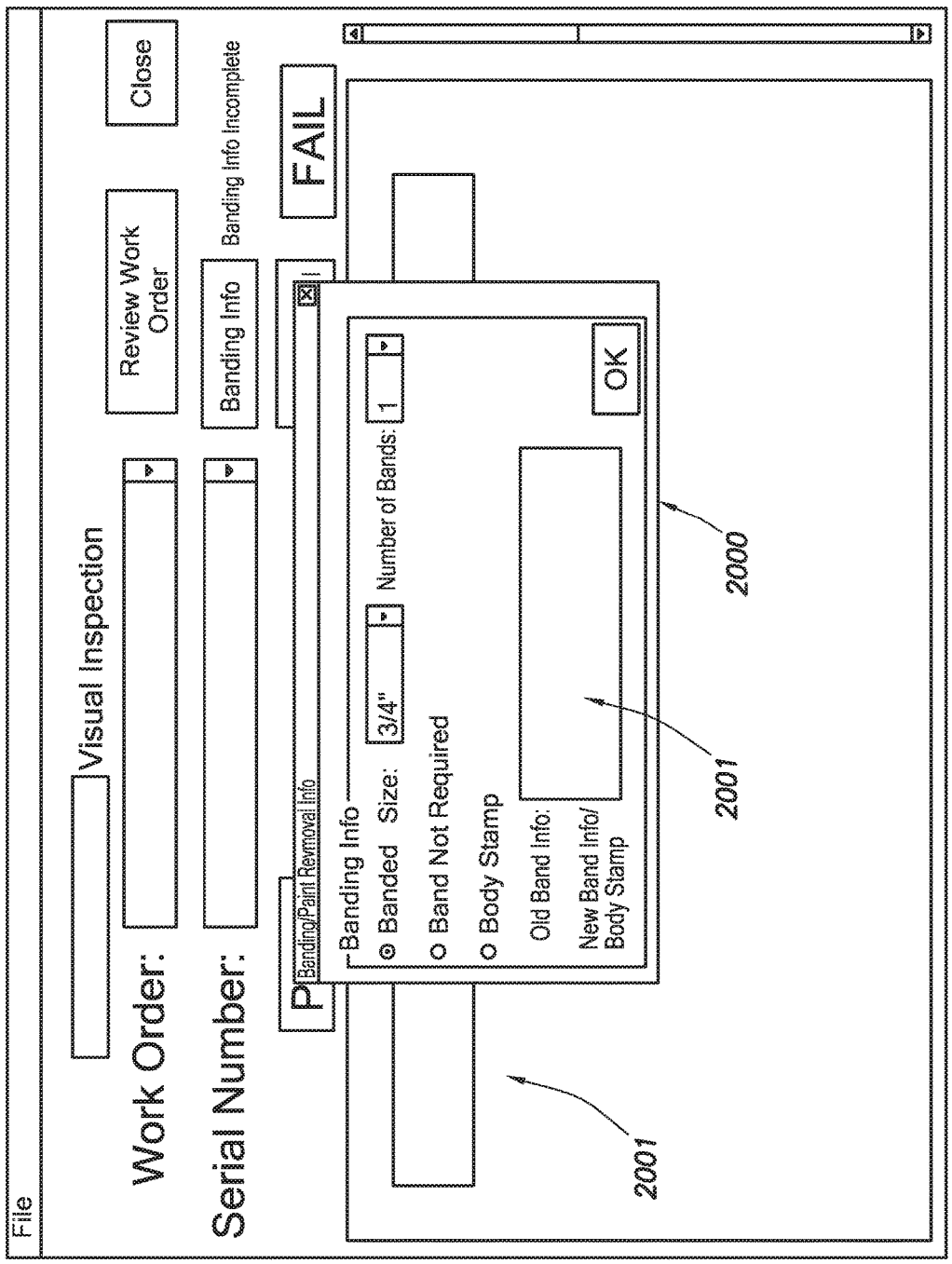
FIG. 20 is a twelfth testing interface display according to embodiments of the present invention.
Figure 21:
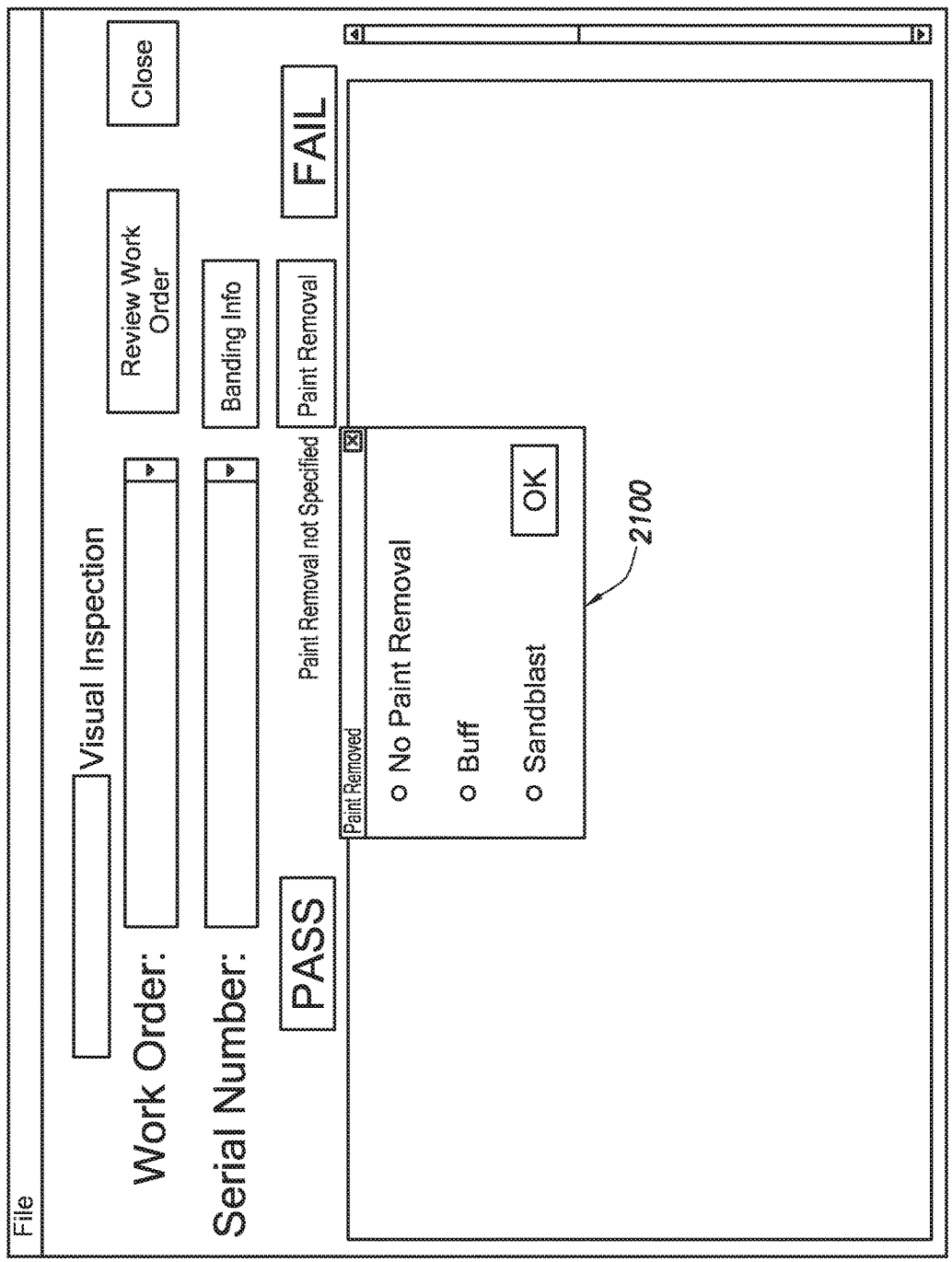
FIG. 21 is a thirteenth testing interface display according to embodiments of the present invention.
Figure 22:
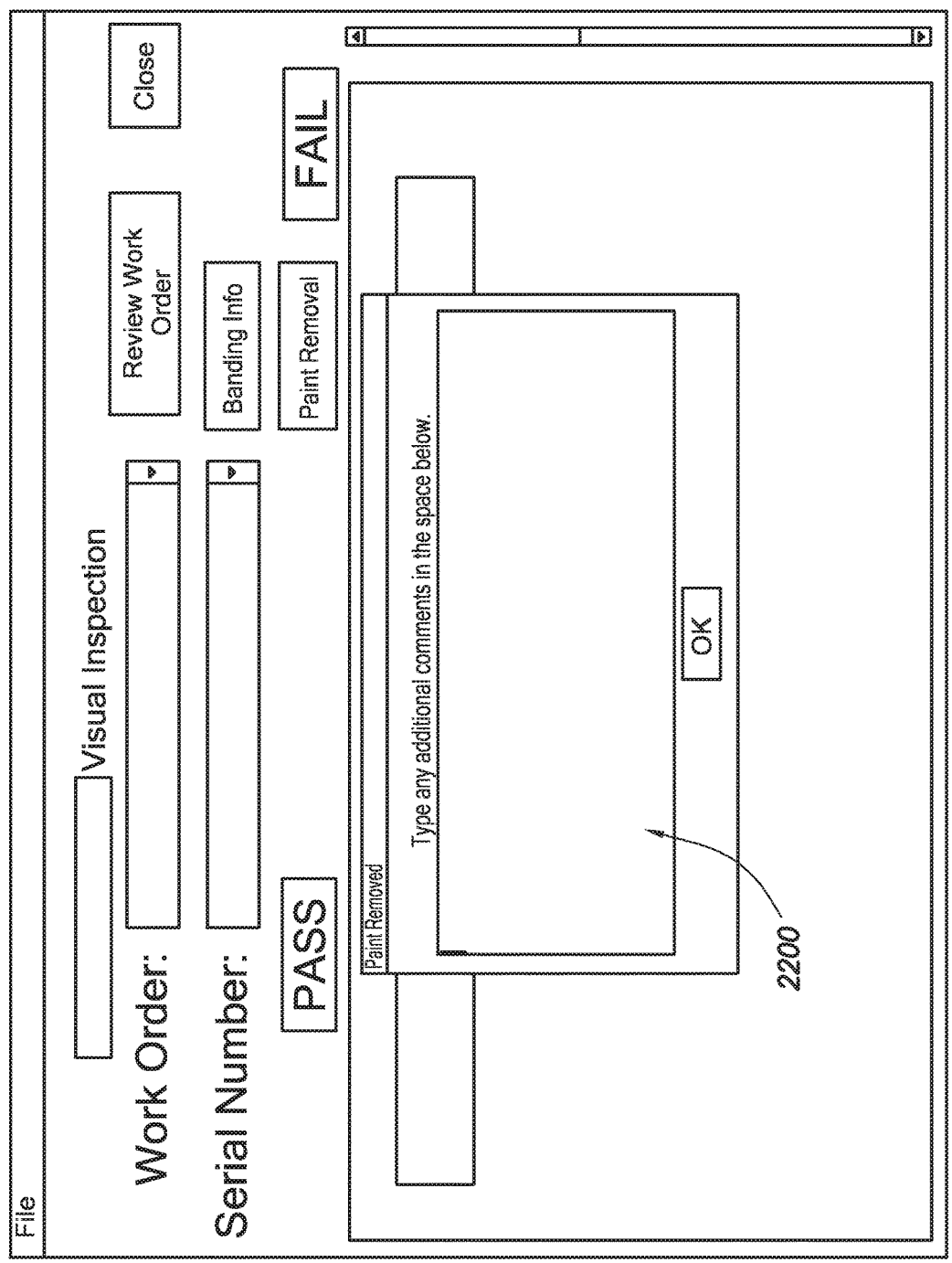
FIG. 22 is a fourteenth testing interface display according to embodiments of the present invention.

In further embodiments of the present invention, the testing module 210 requires full manual performance of the testing operations for certain test sequences. For testing modules having full manual performance of testing operations, such as for the visual inspection sequence, the testing module 210 can prompt the testing user 151 with instructions for the testing user 151 to perform testing operations pursuant to the test specification. As shown in FIGS. 20-21, band information 2000 and paint parameters 2100 can be input by the testing user 151 responsive to instructions provided by the testing module 210 to the test interface 150, the testing module 210 providing such instructions responsive to the sequence of testing operations and the test specification. As can be seen in FIG. 17, for example, the testing interface 150 can display the schematic 2001 from the test specification to the testing user 151 and instructs the user how to perform the test operations with respect to information set forth in the schematic and the test specification.

Responsive to systematic, manual, or hybrid systematic/manual performance of the test operation described above, the testing module 210 receives testing data either as captured by the testing apparatus 110 for the corresponding testing sequence or as captured by the testing user 151 and entered into the testing interface 150 according to specific instructions provided by the testing module 210, e.g., at banding menu 2000. As shown in FIG. 4, the testing data is stored in the table 440 and linked to the device library 400 for the selected well equipment device 101. Also as shown in FIG. 4, an exemplary embodiment of the testing data in table 440 can have individual cells for each testing sequence (e.g., wall thickness, pressure test, visual inspection, etc.). The testing data in table 440 can be used, as is discussed further herein, to generate certification data by execution of the certification module 220 on the processor 251.

Additionally, further embodiments of the present invention include certain test sequences as described in FIGS. 6A-9. These test sequences, for example, can include disassembly/assembly, magnetic particle ("mag particle") inspection, paint, and final inspection. Although an embodiment of the invention includes manual performance of the test operations for these sequences, each of these test sequences may be implemented either by systematic, manual, or hybrid systematic/manual performance of the testing operations. Regardless of whether the performance of the testing operations are performed systematically or manually, those skilled in the art will realize that all testing operations are performed responsive to a command or instruction being systematically issued by the testing module 210 when executed on the central management server 100. As such, any test operation described herein as manual can be performed systematically provided there exists a testing apparatus 110 that can receive an instruction from the central management server 100 to perform the operation. For example, the performance of test operations using a digital caliper may be performed either manually or systematically, although an embodiment employs manual performance of such operations. Those skilled in the art will understand that it is within the scope of the invention to employ a testing apparatus 110 having a digital caliper, actuator, and an control device to systematically perform a wall thickness measurement using a digital caliper in addition to the embodiment employing manual performance. Likewise, it will be understood by those in the art that any manual operation described herein may also be performed systematically under the architecture of the central management server as set forth in FIG. 2.

Certification Module 220

As is shown in FIG. 2, the certification module 220 may be a computer program product stored in the non-transitory memory 240 on the central management server 100 and operable on the processor 251 thereof. Computer program product 220 contains instructions that are operable on the processor 251 that cause the certification module 220 and the central management server 100 to perform the operations discussed further herein.

The certification module 220 can interact with the processor to receive or transmit data, instructions, and other information from or to any of the devices connected to I/O 252. In addition both the certification module 220 and the testing module 210 are in communication with the processor 251 and the non-transitory memory 240 so that modules can pass or return variables between modules according to a shared API or access global variables being stored on the non-transitory memory 240 to ensure interoperability and open communication between computer program products in communication with the processor 251. Likewise, those skilled in the art will understand that computer program products 220 and 210 are capable of passing, returning, or referencing common variables regardless of whether computer program products are executed on the same processor 251, but that a common API will allow interoperability and open communications. In embodiments discussed below, the certification module 220 at least interacts with the testing interface 150, RFID reader 130, RFID writer 140, and database 170. Although testing interface 150 has been described to be a PC, testing interface 150 can also be implemented in whole or in part as a user terminal interface on the central management server 100 itself, using a keyboard, display, or media inputs and outputs connecting to the I/O 252. The testing interface 150 can also be a lightweight graphical user interface (GUI) operable over a web browser and viewable on any browser-enabled device, such as a PC, smart phone, or other equipment having a processor and computer functionality.

The certification module 220 can receive a device identifier for a selected well equipment device 101. As described above, "well equipment devices" includes the equipment and devices used in hydraulic fracturing for oil and gas wells, i.e. "high pressure hydraulic fracturing flow iron," "frac iron," or, simply, "iron." Frac iron can include, for example, a slurry blender, high pressure/volume fracturing pumps, high pressure treating iron, and other pipes, joints, valves, and fittings. For example, frac iron can include swivel joints, pup joints, plug valves, check valves and relief valves. Furthermore, by way of example, frac iron can include any type of ball injector, crow's foot, air chamber, crossover, hose, pipes/piping, hose loop, ball injector tee body, tee, wye, lateral, ell, check valve, plug valve, wellhead adapter, swivel joint, plug, relief valve, densometer, cross, frac pump, or cement pump. The selected well equipment device is a well equipment device that has previously undergone testing, for example, as described above with respect to the testing module 210. The certification module 220 can receive a device identifier, for example, responsive to receiving input from the testing interface 150 as entered therein by a testing user 151. The certification module 220 can also receive a device identifier, for example, responsive to receiving input from a remote user interface as entered therein by a remote user 161. Furthermore, the certification module 220 can receive a device identifier from the testing module 210 responsive to the testing module 210 having completed execution of the testing operations and the generation and linking of the testing data in the database 170. The certification module 220 can identify a selected well equipment device responsive to the device identifier and generate and link certification data in database 170, for example, in certification table 450, responsive to the testing data. For example, the certification data 450 can include all data as can be entered onto certificate 500 as a summary or other rendering of testing data responsive to testing operations being performed on the well equipment device 101, for example, a graphical representation of a pressure test 503. The certification module 220 can include logic to generate charts and data modeling based upon testing data, which is raw data stored, for example, in table 440. Further examples of summaries or renderings of raw testing data responsive to the testing operations appear on the face of certificate 500. As a result of the linking operation, the certification data 440 can be readily accessed or queried according to a serial number for a well equipment device.

The certification module 220 can also generate certification data in a format responsive the proprietary data table format for the exemplary RFID certificate. For example, certification module 220 may generate certificate data according to specific standards or protocols employed in the proprietary standard, for example, cell size, packet size, header length, payload length, etc. The RFID certificate can be generated so that it is ready to be stored to the media attached to the well equipment without further processing. The certification module 220 may also include logic for rendering graphics stored as certification data, such as the schematics and charts, into a lightweight graphics formats such as vector graphics formats. The RFID certificate, for example, can include all fields available on the paper document, including device identifier 501, pass or fail grading 502, tabular summary or rendering of test data 503, drawing 504, measured values 505, and demanded values 506. The tabular summary or rendering 503 and the drawing 504 can be encoded in lightweight vector graphics formats, for example.

Reporting Module 230 and Enterprise Resource Planning Interface

As is shown in FIG. 2, the reporting module 230 may be a computer program product stored in the non-transitory memory 240 on the central management server 100 and operable on the processor 251 thereof. Computer program product 230 contains instructions that are operable on the processor 251 that cause reporting module 230 and the central management server 100 to perform the operations discussed further herein.

The reporting module 230 can interact with the processor 251 to receive or transmit data, instructions, and other information from or to any of the devices connected to I/O 252. In addition, both the reporting module 230 and the testing module 210 are in communication with the processor 251 and non-transitory memory 240 so that these two modules can pass or return variables between each other according to a common application programming interface (API) or shared global variables being stored on the non-transitory memory 240, thereby enhancing interoperability and open communication between the modules. Likewise, those skilled in the art will understand that computer program products 230 and 220 are capable of passing, returning, or referencing common variables regardless of whether computer program products are executed on the same processor 251 and that a common API will allow interoperability and open communications as described above. In embodiments discussed below, the reporting module 230 at least interacts with the testing module 210, certification module 220, and database 170. Although remote user interface 160 may be a PC as has been described for testing interface 150, remote user interface 160 can also be implemented in whole or in part as a user terminal interface on the central management server 100 itself, using a keyboard, display, or media inputs and outputs connecting to the I/O 252. Remote user interface 160 can also be a lightweight graphical user interface (GUI) operable over a web browser and viewable on any browser-enabled device, such as a PC, smart phone, or other equipment having a processor and computer functionality.

The reporting module 230 can receive a device identifier for a selected well equipment device 101, the selected well equipment device being a well equipment device that has previously undergone testing, for example, as described above with respect to the testing module 210. The reporting module 230 can receive a device identifier, for example, responsive to receiving input from the testing interface 150 as entered therein by a testing user 151. The reporting module 230 can also receive a device identifier from any other module, as discussed above. In response to receiving the device identifier, the reporting module 230 can match the device identifier to any desired data in the database 170, for example, testing data in the database at testing data table 440, certification data in the certification data table 450, device library data from the device library table 410, and test specification data from the specification library 420. The reporting module, responsive to the device identifier, can return any of the test specification for the selected well equipment device 101, testing data for a plurality of testing sequences performed on the selected well equipment device 101, and certificate data for the selected well equipment device 101, for example, according to the database structure provided in FIG. 4.

The reporting module 230 may also receive an indication or selection of additional variables for reporting purposes, for example, a part number, work order number, etc. In the event that the reporting module 230 receives an additional variable, the reporting module 230 can or expand or refine the matched data with respect to the additional variable. For example, the reporting module 230 may receive a device identifier, a work order number, and the reporting module 230 will return a list of all certifications, tests, or specifications for that device identifier according to the tests performed under the received work order number. On the other hand, a reporting module 230 may receive a device identifier and a part number, and the reporting module 213 will return a list of all certifications, tests, or specifications for either the selected well device 101 or all well devices tested having the selected the part number.

Embodiments of the present invention employing the reporting module 230 are beneficial in that they transform the task of testing and certification—once a costly operational hurdle—into a robust data-point in business and operational management decisions. For example, manufacturers may use embodiments of the reporting module in research and development to better understand wear patterns and rates in real-world applications, to build a better product, and to manage customer relations. As those skilled in the art will appreciate, the reporting module 230 can be a powerful tool in achieving management-level value from systematic testing and certifications, which provides a comprehensive and reliable (i.e., consistent) pool of data pertaining to asset management, inventory management, purchasing, risk management, and other business analytics. Exemplary reports generated by the reporting module 13 are shown in FIGS. 24-25.

Furthermore, embodiments of the present invention can employ an ERP (Enterprise Resource Planning) interface (not pictured) connected to the I/O of the central management server 100 to provide the foregoing benefits realized by the reporting module, but in a manner that is more fully integrated into enterprise-wide information systems and providing high levels of cross-functional integration, network scalability, and real-time data synchronization. In particular, embodiments of the present invention employ an ERP interface for the purposes of invoicing the testing and certification operations, for example, responsive to work order information entered by a testing user 151 to the testing interface 150 as shown in FIG. 6A.

RFID 130, 135, 140

Furthermore, embodiments of the present invention can achieve some or all of the foregoing objectives by providing a central management server 200 that can communicate with one or more well equipment devices 101. For example, the central management server 200 can be in communication with the one or more well equipment devices using wireless communication technologies, for example, radio frequency identification (RFID) technologies. The one or more well equipment devices 101 can include an RFID tag 135, and the central management server 200 can communicate with the RFID tag 135 on the one or more well equipment devices using an RFID reader 130 in communication with the central management server 200 through the I/O 252. In an embodiment, the RFID tag is a UHF Gen-2 RFID tag that is attached to the frac iron using a clamp designed to be sufficiently robust so that the RFID tag is not affected by the harsh operating conditions of the downhole environment.

In an embodiment, the RFID reader 130 and RFID 140 are peripherals to the testing interface 150, attaching thereto by known connection means in the art, such as a USB cable or cables. In certain embodiments, the RFID reader and RFID writer may be one unit, such as an RFID reader/writer device.

The RFID reader 130 can read a device identifier from the RFID tag on a selected well equipment device 101 through radio frequency communication and transmit the device identifier to the central management server 200. The central management server is positioned to receive the device identifier from the RFID reader 130. Any of the computer program products discussed herein, such as the testing module 210, can receive a device identifier responsive to the central management server 200 receiving a device identifier from the RFID reader 130. An embodiment of a computer-implemented method for using the RFID reader 130 includes the testing user 151 having a handheld and/or remote RFID reader 130 in physical proximity to the selected well equipment device 101 and the RFID tag 135 thereon so that the testing user can interrogate the RFID tag 135 and so that the RFID tag can transmit the device identifier to the RFID reader 130.

The RFID writer 140 can write an RFID certificate to the RFID tag on a selected well equipment device 101 through radio frequency communication and transmit the device identifier to the central management server 200. The RFID certificate can have the qualities and properties as described herein, preferably including at least a serial number. The central management server is positioned to transmit the RFID certificate or any data included therein to the RFID writer 140 responsive to any of the computer program products discussed herein, such as the certification module 220. An embodiment of a computer-implemented method for using the RFID writer 140 includes the testing user 151 having a handheld or remote RFID writer 140 in physical proximity to the selected well equipment device 101 and the RFID tag 135 thereon so that the testing user can establish a communication link with the RFID tag 135 and so that the RFID writer can transmit and store the RFD certificate or the information therein to the RFID tag 135.

This application claims priority and is related to U.S. Provisional Patent Application No. 61/330,248 filed Apr. 30, 2010 titled "Machines, Systems, Computer-Implemented Methods, And Computer Program Products To Test And Certify Oil And Gas Equipment," which is incorporated by reference in its entirety herein.

The foregoing has broadly outlined certain features, and technical advantages of the present invention and a detailed description of the invention so that embodiments of the invention may be better understood in light of features and advantages of the invention as described herein, which form the subject of certain claims of the invention. It should be appreciated that the conception and specific embodiments disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further advantages are better understood from the description when considered in connection with the accompanying figures. It is to be expressly understood, however, that such description and figures are provided for the purpose of illustration and description only and are not intended as a definition of the limits of the present invention. For example, although the example embodiments discussed herein are directed to oil and gas hydraulic fracturing operations, it should be specifically noted that the systems, machines, methods, and computer program products to test and certify well equipment devices may be employed to carry out similar functions for other equipment or devices requiring routine testing and certification, including without limitation, aircraft maintenance and construction, ship maintenance and construction, facilities maintenance and construction, and so on.

What is claimed is:

1. A system for electronically certifying an oil and gas device, the system comprising:
    memory accessible by one or more servers, the memory storing a database of associations of device identifiers corresponding to a plurality of oil and gas equipment; and
    one or more processors programmed for:
        receiving a device identifier stored on an electronic tag affixed to an oil and gas device from a device of a user testing the oil and gas device,
        identifying the oil and gas device in the database based on the received device identifier,
        accessing a history of previous testing of the identified oil and gas device,
        selecting a sequence of testing operations for the user testing the oil and gas device to perform based on the previous testing of the identified oil and gas device,
        transmitting the sequence of testing operations to the device of the user for instructing the user to perform the sequence of testing operations,
        receiving, from the device of the user, test data responsive to performance of at least one testing operation in the sequence of testing operations, and
        storing the received testing data in the database in association with the identified oil and gas device.

2. The system of claim 1, wherein the electronic tag affixed to the oil and gas device comprises a radio frequency identification (RFID) tag storing the device identifier.

3. The system of claim 1, wherein the device of the user comprises a radio frequency identification (RFID) reader for accessing the device identifier from the electronic tag.

4. The system of claim 1, wherein said one or more processors are further programmed for:
analyzing the testing data responsive to the performance of the at least one testing operation,
determining the oil and gas device passed the at least one testing operation, and
generating a certificate certifying the oil and gas device for operation based, at least in part, on said determination that the oil and gas device passed the at least one testing operation.

5. The system of claim 4, wherein said one or more processors are further programmed for storing the generated certificate indicating the oil and gas device is certified for operation in the database linked to the device identifier associated with the oil and gas device.

6. The system of claim 1, wherein said one or more processors are further programmed for:
analyzing the testing data responsive to the performance of the at least one testing operation,
determining the oil and gas device failed the at least one testing operation, and
generating a certificate certifying the oil and gas device is to be discarded based, at least in part, on said determination that the oil and gas device failed the at least one testing operation.

7. The system of claim 6, wherein said one or more processors are further programmed for transmitting the generated certificate indicating the oil and gas device is to be discarded to the device of the user testing the oil and gas device for communication to the electronic tag affixed to the oil and gas device.

8. The system of claim 1, further comprising a band affixed to the oil and gas device for holding the electronic tag.

9. The system of claim 1, wherein the selected oil and gas device comprises at least one member of a group comprising: a slurry blender, a fracturing pump, a pipe, a swivel joint, a pup joint, a plug valve, a check valve, a relief valve, a ball injector, a crow's foot, an air chamber, a crossover, a hose, a pipe, a hose loop, a ball injector tee body, a tee, a wye, a lateral, an ell, a check valve, a plug valve, a wellhead adapter, a swivel joint, a plug, a cross, a valve seat, a valve head, a frac pump, or a cement pump.

10. The system of claim 1, wherein said one or more processors are further programmed for identifying, based on the received device identifier, the sequence of testing operations, the sequence of testing operations comprising one or more benchmark parameters to which the sequence of testing operations are to be performed.

11. The system of claim 1, wherein said one or more processors are further programmed for:
identifying at least one testing apparatus to perform the at least one testing operation, and
providing instructions to the device of the user for operating the at least one testing apparatus to perform the at least one testing operation,
wherein said testing data originates from the at least one testing apparatus performing the at least one testing operation.

12. A method for electronically certifying an oil and gas device being tested by a testing user, the oil and gas device having an electronic tag affixed thereto that stores a device identifier associated with the oil and gas device, the method comprising:

accessing the device identifier from the electronic tag;
transmitting the device identifier from a device of the testing user to one or more servers that have access to previous testing data associated with the oil and gas device;
receiving one or more testing operations to perform on the oil and gas device, the one or more testing operations selected based on the device identifier and the previous testing data associated with the oil and gas device;
instructing the testing user to perform the one or more testing operations;
capturing testing data responsive to performance of the one or more testing operations on the oil and gas device; and
transmitting the testing data to the one or more servers for use in generating a certificate indicating the oil and gas device is either ready for operation or is to be discarded.

13. The method of claim 12, wherein the one or more testing operations comprise at least one of a wall thickness test, a pressure test, or visual inspection test.

14. The method of claim 12, wherein said instructing the testing user to perform the one or more testing operations comprises performing the wall thickness test before performing the pressure test.

15. The method of claim 12, further comprising:
receiving the certificate from the one or more servers; and
transmitting the certificate to the electronic tag for storage thereon.

16. The method of claim 12, wherein the electronic tag comprises an RFID tag and said accessing of the device identifier from the electronic tag is performed by a computing device of the testing user.

17. The method of claim 12, further comprising receiving the certificate and presenting the testing user with a notification that the oil and gas device is either ready for operation or is to be discarded.

18. The method of claim 12, further comprising wirelessly transmitting the certificate for storage on the electronic tag affixed to the oil and gas device.

19. One or more non-transitory memory embodied with machine-executable instructions for certifying an oil and gas device being tested by a testing user, the oil and gas device having an electronic tag affixed thereto that stores a device identifier associated with the oil and gas device, comprising:
receiving, from the device of the testing user, the device identifier stored on electronic tag of the oil and gas device to be tested;
selecting, based on the received device identifier, testing operations for certifying the oil and gas device;
notifying the device of the testing user of the selected testing operations;
receiving testing data upon performance of the selected testing operations by the testing user;
comparing the received testing data against testing criteria for the oil and gas device;
generating a certificate for storage on the electronic tag indicating the oil and gas device is either fit or not fit for use based on the comparison of the received testing data against the testing criteria; and
transmitting the generated certificate to the device of the testing user for storage on the electronic tag.

20. The one or more non-transitory memory of claim 19, wherein said receiving the upon performance of the selected testing operations by the testing user comprises:

identifying a testing apparatus available to the testing user for performing at least one of the selected testing operations;
controlling, by the one or more servers, the testing apparatus over a network during performance of the at least one of the selected testing operations; and
receiving the testing data over the network from the testing apparatus.

\* \* \* \* \*